(12) United States Patent
Powers et al.

(10) Patent No.: US 12,217,208 B2
(45) Date of Patent: *Feb. 4, 2025

(54) SYSTEMS AND METHODS FOR PACKING OPTIMIZATION AND VISUALIZATION

(71) Applicant: PACCURATE, LLC, Brooklyn, NY (US)

(72) Inventors: Patrick Powers, Chelsea, MA (US); James Malley, Baltimore, MD (US)

(73) Assignee: PACCURATE, LLC, Brooklyn, NY (US)

( * ) Notice: Subject to any disclaimer, the term of this patent is extended or adjusted under 35 U.S.C. 154(b) by 201 days.

This patent is subject to a terminal disclaimer.

(21) Appl. No.: 17/566,923

(22) Filed: Dec. 31, 2021

(65) Prior Publication Data

US 2022/0122031 A1 Apr. 21, 2022

Related U.S. Application Data

(63) Continuation-in-part of application No. 16/015,246, filed on Jun. 22, 2018, now Pat. No. 11,216,774.
(Continued)

(51) Int. Cl.
*G06Q 10/0832* (2023.01)
*B65G 1/137* (2006.01)
(Continued)

(52) U.S. Cl.
CPC ......... *G06Q 10/0832* (2013.01); *B65G 1/137* (2013.01); *B65G 1/1373* (2013.01);
(Continued)

(58) Field of Classification Search
CPC ......... G06Q 10/0832; G06Q 10/08345; G06Q 30/0207; G06Q 50/40; G06F 16/24578;
(Continued)

(56) References Cited

U.S. PATENT DOCUMENTS 6,721,762 B1 * 4/2004 Levine ................... G06Q 10/08
707/999.102
6,876,958 B1 4/2005 Chowdhury et al.
(Continued)

FOREIGN PATENT DOCUMENTS

GB 2524952 10/2015
WO 2010099809 9/2010

OTHER PUBLICATIONS

TOPS Software, Optimize Packaging Design Size Shipcase and Carton Configure Pallet LayoutLoad Trucks & Containers Build Mixed Pallets, 2012 (Year: 2012).*
(Continued)

*Primary Examiner* — Tarek Elchanti
(74) *Attorney, Agent, or Firm* — DUANE MORRIS LLP

(57) ABSTRACT

Systems and methods are disclosed for packing optimization and visualization. In one example, a method for managing a shipment of a plurality of products, comprises: obtaining a request for a packing instruction from a user via a user interface; ranking the products based on their weight information and dimension information to generate a first ranking list; ranking one or more containers based on their dimension information to generate a second ranking list; determining, based on the first ranking list and the second ranking list, a plurality of layout configurations for packing the products into at least one container selected from the one or more containers; selecting a layout configuration from the plurality of layout configurations based at least partially on a rate table including shipping rate information of one or more shipping carriers identified by the user, wherein the selected layout configuration minimizes a cost of shipping the products; generating a visual illustration of the layout configuration; and providing a packing instruction comprising the visual illustration to the user via the user interface.

20 Claims, 13 Drawing Sheets

Related U.S. Application Data

(60) Provisional application No. 62/523,568, filed on Jun. 22, 2017.

(51) Int. Cl.
*B65G 57/00* (2006.01)
*G06F 16/2457* (2019.01)
*G06Q 10/0834* (2023.01)
*G06Q 30/0207* (2023.01)

(52) U.S. Cl.
CPC ....... *B65G 57/00* (2013.01); *G06F 16/24578* (2019.01); *G06Q 10/08345* (2013.01); *G06Q 30/0207* (2013.01); *Y10S 414/116* (2013.01)

(58) Field of Classification Search
CPC ...... B65G 1/137; B65G 1/1373; B65G 57/00; Y10S 414/116; B65B 2220/14; B65B 5/10; B65B 5/12; B65B 57/00
USPC ................................... 705/330, 28; 700/259
See application file for complete search history.

(56) References Cited

U.S. PATENT DOCUMENTS

| | | | |
|---|---|---|---|
| 7,184,855 B2 | 2/2007 | Stingel et al. | |
| 8,504,413 B1* | 8/2013 | Rowe | G06Q 10/08 |
| | | | 705/28 |
| 11,772,833 B1* | 10/2023 | Shi | B65B 5/08 |
| | | | 700/259 |
| 2003/0200111 A1 | 10/2003 | Damji | |
| 2005/0055181 A1 | 3/2005 | Verdura et al. | |
| 2005/0197892 A1 | 9/2005 | Bilibin et al. | |
| 2012/0158627 A1 | 6/2012 | Sundar | |
| 2013/0218799 A1 | 8/2013 | Lehmann et al. | |
| 2014/0067104 A1 | 3/2014 | Osterhout | |
| 2014/0172736 A1* | 6/2014 | Saha | G06F 30/12 |
| | | | 705/330 |
| 2014/0279657 A1 | 9/2014 | Stowe | |
| 2016/0254758 A1 | 9/2016 | Wadhawan et al. | |
| 2017/0154127 A1 | 6/2017 | Madmony et al. | |
| 2018/0061255 A1 | 3/2018 | Ekambaram et al. | |
| 2018/0374046 A1 | 12/2018 | Powers et al. | |

OTHER PUBLICATIONS

T.-H.S. Li et al., "A Three-Dimensional Adaptive PSO-Based Packing Algorithm for an IoT-Based Automated e-Fullfillment Packaging System," IEEE Access, vol. 5, pp. 9188-9205, (May 10, 2017).

Yu, "Evaluation of Outbound Operations Improvement Projects for Distribution Centers", Master of Engineering in Advanced Manufacturing and Design at Massachusetts Institute of Technology, 2019.

* cited by examiner

Carton Packing

Shipment Information: 12 Containers 41 Items

Container Type: Extra Large Box 2
Container Weight: 17lbs 6.4oz   Container Dimensions: 6in x 15.75in x 14.125in

| Container 1 | Item Ref | Dimensions | Weight | Qty |
|---|---|---|---|---|
|  | PN-002 | 6,7,8 | 0.9 | 2 |
|  | PN-001 | 4,5,3 | 0.1 | 6 |
|  | PN-005 | 2,3,4 | 5 | 3 |

PRINT

SYSTEMS AND METHODS FOR PACKING OPTIMIZATION AND VISUALIZATION

CROSS-REFERENCE TO RELATED APPLICATIONS

This application is a continuation-in-part of U.S. patent application Ser. No. 16/015,246, filed on Jun. 22, 2018, which claims priority to U.S. Provisional Application No. 62/523,568 filed on Jun. 22, 2017, each of which is hereby incorporated by reference herein in its entirety.

FIELD OF THE DISCLOSURE

The present disclosure relates generally to packing and, more specifically, to systems and methods for optimizing packing to achieve a lowest cost shipping solution and visualize the solution as a packing instruction.

BACKGROUND

Business entities are shipping more and more products via different carriers due to a rapid growth of online shopping in the e-commerce industry. Existing packing and cartonization methods typically aim to fit items to be shipped into the fewest number of boxes. Such methods generally consider the size of the items to be packed and the size of available cartons, and calculate a packing solution to place all items into the smallest number of cartons. That is, previous packing methods typically attempt to optimize volume utilization or other dimensional values. These methods fail to achieve a cost-optimal solution because they fail to consider a wide range of cost factors beyond simply the dimensions of the items to be shipped.

Similarly, shipping cost estimators, such as those used on websites to provide an estimated shipping cost to online shoppers, typically optimize based on: (1) the fewest number of boxes, (2) a historical average of shipping costs, or (3) a volume comparison against average cost-per-volume to provide the estimate. Studies have shown that high shipping cost estimates may be the greatest contributor to online shopping cart abandonment (i.e., loading a shopping cart without ultimately purchasing the items). Online retailers therefore have an incentive to provide quick and accurate shipping estimates. Overestimating the shipping cost is more likely to lead to shopping cart abandonment. Underestimating the shipping cost usually results in the online retailer absorbing the additional cost and thus decreases profits. As such, existing methods for providing packing solutions are not entirely satisfactory.

SUMMARY

The present disclosure relates generally to packing and, more specifically, to systems and methods for optimizing packing to achieve a lowest cost shipping solution and visualize the solution as a packing instruction.

According to an aspect of the present disclosure, a method for managing a shipment of a plurality of products comprises: obtaining a request for a packing instruction from a user via a user interface, wherein the request comprises: weight information and dimension information of the plurality of products, dimension information of one or more containers available for containing the plurality of products; obtaining a rate table including shipping rate information related to one or more shipping carriers identified by the user; ranking the plurality of products based on at least one of the weight information and dimension information of each product to generate a first ranking list; ranking the one or more containers based on their dimension information to generate a second ranking list; determining, based on the first ranking list and the second ranking list, a plurality of layout configurations for packing the plurality of products into at least one container selected from the one or more containers; selecting a layout configuration from the plurality of layout configurations based at least partially on the rate table, wherein the selected layout configuration minimizes a cost of shipping the plurality of products; and providing a packing instruction based on the selected layout configuration to the user via the user interface. In one embodiment, the at least one or more containers is a list of all possible container sizes within a pre-determined range and the dimensions of the at least one selected container is used to create a custom container. In one embodiment, the packing instruction comprises a visual illustration of the selected layout configuration. In another embodiment, the packing instruction comprises a machine-readable result of the selected layout configuration, which may comprise information related to: every container, coordinates of every item packed within the container, calculated rate estimates for each container, etc. A visual illustration may include additional data like graphics, images, or videos, generated during the process, to provide an interpretation of the machine-readable result.

In a preferred embodiment, the rate table lists shipping rates of each of the one or more shipping carriers according to information about at least one of the following: a weight of a container having at least one product to be shipped; a container type of the container; and a product type of the at least one product; insurance information of the at least one product; and a discount or deal agreed between the user and at least one of the one or more shipping carriers regarding a shipment of the plurality of products. In a preferred embodiment, the request further comprises characteristics of the plurality of products, wherein the characteristics comprise whether each product is stackable, rollable, foldable, and/or forbidden to be packed with another product; and determining the plurality of layout configurations comprises determining each of the plurality of layout configurations based on the characteristics of the plurality of products.

In a preferred embodiment, the method further comprises: obtaining, regarding each of the one or more shipping carriers, a dimensional weight associated with the at least one container from a third party or the shipping carrier, wherein the dimensional weight is determined based on a volume and a dimensional factor associated with the at least one container; and comparing the dimensional weight with actual weight of the at least one container including the plurality of products to generate a comparison result, wherein the selected layout configuration is selected further based on the comparison result. The rate table comprises shipping rates according to a discount or deal agreed between the user and at least one of the one or more shipping carriers regarding the dimensional weight associated with the at least one container.

In a preferred embodiment, the method further comprises: obtaining, from a third party or the one or more shipping carriers, zone information of origin and destination for shipping the plurality of products, wherein: the zone information is determined by each of the one or more shipping carriers, and the selected layout configuration is selected further based on the zone information. The rate table comprises shipping rates according to a discount or deal agreed between the user and at least one of the one or more shipping carriers regarding the zone information associated with the origin and the destination for shipping the plurality of products.

In a preferred embodiment, the first ranking list includes the plurality of products in a volume descending order, in a longest single dimension order, or in a largest cross section order; and the second ranking list includes the one or more containers in an ascending order of volume remaining in the one or more containers, in an ascending order of additional cost to add next product in the one or more containers, or in an ascending order of cost per product in the one or more containers. In one embodiment, different sorting criteria are tried in parallel to determine a cost-optimal result. In a preferred embodiment, determining each of the plurality of layout configurations comprises: picking a product on top of the first ranking list; searching, from top to bottom of the second ranking list, for a container that satisfies one or more rules based on information of the product, the container, and the rate table; assigning the product to a location within the container for packing; updating information of the product, the container, the second ranking list, and the layout configuration; updating the first ranking list by removing the product from the first ranking list; and iterating the above steps until no product is left in the first ranking list or products are moved to a leftover array as not being able to be packed. In a preferred embodiment, searching for a container comprises searching for a container that adds a minimum cost for shipping the product in the container in addition to shipping existing products that are already assigned for packing, compared to shipping the product in any other container in the second ranking list. In a preferred embodiment, searching for a container comprises: determining that no container in the second ranking list satisfies the one or more rules based on existing products already assigned for packing; opening a container that has a lowest cost-per-item among the second ranking list; and re-assigning at least one product previously assigned to the container for assigning the product into the opened container.

In a preferred embodiment, the method further comprises: calculating, based on each of the plurality of layout configurations and the rate table, an estimated shipping rate for a shipment of the plurality of products according to the layout configuration, wherein selecting the layout configuration comprises selecting the layout configuration that minimizes the estimated shipping rate among the plurality of layout configurations. In a preferred embodiment, the one or more containers comprise at least one carton or pallet; and each of the plurality of layout configurations is for packing the plurality of products into the at least one carton and packing the at least one carton into the at least one pallet. In a preferred embodiment, the method further comprises: obtaining, from the user via a user interface, an input regarding the packing instruction provided to the user; updating the plurality of layout configurations for packing the plurality of products based on the input; updating the selected layout configuration based on the updated plurality of layout configurations and the input; generating an updated visual illustration based on the updated layout configuration; and providing the updated visual illustration to the user via the user interface.

According to another aspect of the present disclosure, a system having at least one processor, storage, and a communication platform connected to a network for managing a shipment of a plurality of products, comprises: a user interface configured for obtaining a request for a packing instruction from a user, wherein the request comprises: weight information and dimension information of the plurality of products, dimension information of one or more containers available for containing the plurality of products, and a rate table including shipping rate information related to one or more shipping carriers identified by the user; a ranking unit configured for ranking the plurality of products based on at least one of their weight information and dimension information to generate a first ranking list, and ranking the one or more containers based on their dimension information to generate a second ranking list; a layout determiner configured for determining, based on the first ranking list and the second ranking list, a plurality of layout configurations for packing the plurality of products into at least one container selected from the one or more containers, and selecting a layout configuration from the plurality of layout configurations based at least partially on the rate table, wherein the selected layout configuration minimizes a cost of shipping the plurality of products; a layout visualizer configured for generating a visual illustration of the layout configuration; and a packing instructor configured for providing a packing instruction comprising the visual illustration to the user via the user interface.

According to yet another aspect of the present disclosure, a system having at least one processor, storage, and a communication platform connected to a network for managing a shipment of a plurality of products, comprises: a user interface configured for obtaining a request for a packing instruction from a user, wherein the request comprises: weight information and dimension information of the plurality of products, dimension information of one or more containers available for containing the plurality of products, an identification of one or more shipping carriers, and a rate table including shipping rate information related to the one or more shipping carriers from a third party based on the request; a ranking unit configured for ranking the plurality of products based on at least one of their weight information and dimension information to generate a first ranking list, and ranking the one or more containers based on their dimension information to generate a second ranking list; a layout determiner configured for determining, based on the first ranking list and the second ranking list, a plurality of layout configurations for packing the plurality of products into at least one container selected from the one or more containers, and selecting a layout configuration from the plurality of layout configurations based at least partially on the rate table, wherein the selected layout configuration minimizes a cost of shipping the plurality of products; a layout visualizer configured for generating a visual illustration of the layout configuration; and a packing instructor configured for providing a packing instruction comprising the visual illustration to the user via the user interface.

BRIEF DESCRIPTION OF THE DRAWINGS

The following will be apparent from elements of the figures, that are provided for illustrative purposes and are not necessarily to scale.

FIG. 5 illustrates an exemplary graphic user interface, in accordance with various embodiments of the present disclosure.

Figure 1:
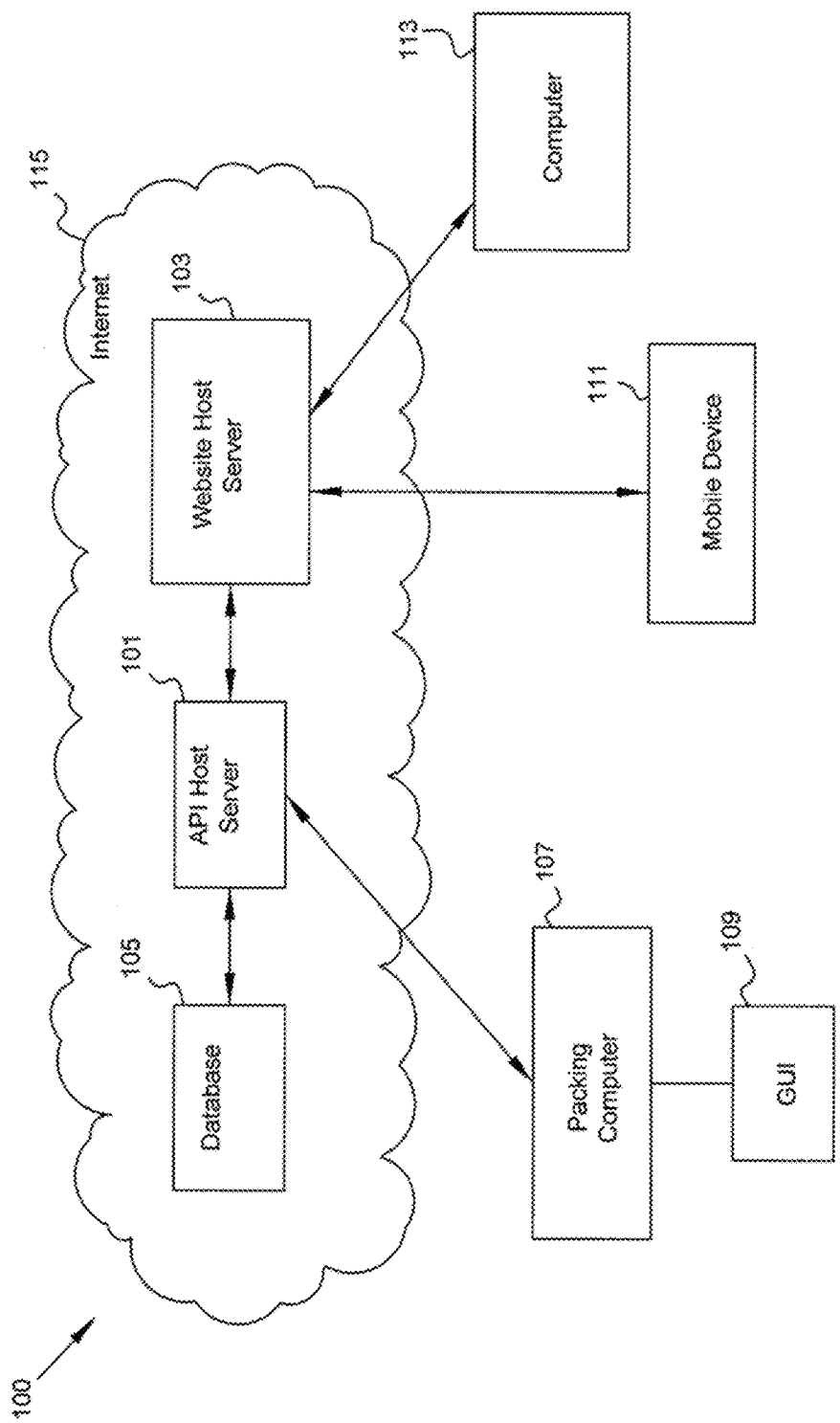
FIG. 1 is a schematic diagram of a system for implementing the presently disclosed subject matter, in accordance with various embodiments of the present disclosure.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments illustrated in the drawings and specific language will be used to describe the same.

The present disclosure is directed to systems and methods of determining packing and cartonization for an item or group of items that overcomes the shortcomings in the prior art discussed above. Specifically, the present disclosure is directed to systems and methods that provide 4D (length, width, height, weight) packing analysis that account for cost factors such as shipping carrier rate tables for weight and zone shipping, reference identification (ID) for stock keeping unit (SKU) characteristics, and packing costs.

Since different shipping carriers likely have different pricing based on weight of a package and distance to be shipped (typically assessed by the number of "zones" a package must cross or a stepped-distance zone from origination point), the presently disclosed method accounts for different rate tables and rate schemes of different shipping carriers. Shipping carriers also allocate different charges based on a "dim factor" or "dimensional factor" which approximates the density of a package. A "dimensional weight" is calculated as the volume of a package (length multiplied by width multiplied by height) divided by the dim factor. Low density packages are typically penalized or given a separate pricing table that is not exclusively based on weight. In other words, once a package has a sufficiently low density, it is typically charged by the higher of either its actual weight or its dimensional weight.

Rate tables, zones, and dim factors are often adjusted by the shipping carriers, and can be separately negotiated between an individual shipper and shipping carrier. These pricing considerations may therefore be unique to each shipper and shipping carrier. The present disclosure provides a method for accounting for these adjustments to ensure optimal packing solutions. Further, rate tables, zones, and dim factors are able to be specially negotiated by certain customers of the shipping carriers. For example, a user may negotiate with a shipping carrier to obtain a discount or deal agreed to by the two parties with respect to a shipment of products. The user may be a shipper having a large volume of products to ship regularly, e.g., a sufficiently high-volume seller that qualifies for negotiation with a shipping carrier. The special or customized discount offered by the shipping carrier to the user may be with respect to a special shipping rate, a dimensional weight factor for all containers, a dimensional weight associated with a specific container type, and/or a zone shipping information associated with the origin and destination of a shipment. The present disclosure provides a method for adjusting these variables to ensure optimal packing solutions.

Using prior art solutions, non-optimal packing and shipping results are frequently obtained. For example, given the penalty incurred by shipping low density packages with most shipping carriers, in some regions it is more expensive to ship a single 100-lb package than two 50-lb packages. Thus, prior art solutions that calculate packaging to minimize the number of packages would not arrive at the cost-optimal solution. To overcome these shortcomings of the prior art requires a packer to make largely subjective determinations regarding the best package configuration. For example, a packer with knowledge of the low density pricing discrepancy described above may subjectively attempt to split large packages into smaller ones. Subjective determinations are relied upon due to the impractical nature of making dim factor and dimensional weight determinations during the packing process. Further, packers are rarely aware of certain negotiated thresholds and are therefore unlikely to subjectively arrive at an optimal packing solution.

In contrast, the presently disclosed systems and methods remove those subjective determinations and replace them with objective, rules-based calculations to optimize packing and cartonization based on cost or any number of other factors. Where packers previously calculated a carton solution without regard to the shipping cost, the effects of rates and other shipping costs are now directly incorporated in the carton solution in a single, rules-based process. Where subjective determinations were made regarding the specifics of shipping, a process is now defined with objective inputs and an optimized output.

Further, the present disclosure transforms information into a new and useful output. Previously disparate carton calculations, rate tables, shipping carrier rules, and packing rules are combined to provide an optimal packing and shipping solution that achieves the lowest possible cost.

The present disclosure generates a tangible product, namely a packing solution optimized for lowest cost. The output packing solution may be provided to a packer in the form of a packing instruction, which may include a visual illustration of a layout configuration, a machine-readable layout configuration, and/or additional data that can aid interpretation of a machine-readable layout configuration. Throughout the present disclosure, a layout configuration may comprise information about: what containers are selected, where and how to pack each item in a container, the layout of different items in each container, e.g., the coordinates of every item packed within the container, calculated rate estimate for shipping each container, etc.; a visual illustration may include one or more graphics, videos, or images that illustrate a layout configuration; a machine-readable layout configuration may include information of a layout configuration that is readable by a machine, e.g., a computer or a smartphone.

The present disclosure is not merely automating a pre-existing process to make it faster. Rather, the presently disclosed subject matter allows computers to produce optimal packing solutions using a set of objective rules; the optimal packing solutions were previously available only with the benefit of subjective inputs from packers. The disclosed systems and methods use a combined order of specific rules that render information into a specific format that is then used and applied to create desired results: packing instructions for an optimal cartonization and shipping solution. The present disclosure is therefore patentable not merely by virtue of being implemented on a computer, but rather because the disclosed subject matter improves an existing technological process, namely the process of determining an optimal cartonization and shipping solution for a given set of items. The present disclosure is notably not directed to merely organizing existing information into a new form.

With reference to FIG. 1, a system 100 is schematically illustrated for implementing the disclosed methods. In system 100, an application programming interface (API) Host Server 101 hosts the software platform that implements the disclosed methods. Subscribers to API Host Server 101 are given an API key that provides access to the platform. Subscribers have access via an API endpoint. For example, a subscriber Packing Computer 107 is illustrated in communication with API Host Server 101 via the Internet 115. Packing Computer 107 is able to conduct API calls to access and run the methods implemented by the software platform that implements the disclosed methods. In one embodiment, the Packing Computer 107 can consume both a machine-readable layout configuration including, e.g., a legend of contents of each container and a visual illustration that is displayed beside each legend.

API Host Server 101 may be in communication with a Website Host Server 103. For example, Website Host Server 103 may host an online shopping website, and API Host Server 101 may provide packing and shipping cost estimations to the online shopping website. Users, such as a Mobile Device 111 and/or Computer 113, may access the online shopping website via the Internet 115. While shopping, Website Host Server 103 conducts API calls to access and run the methods implemented by the software platform that implements the disclosed methods.

Each of the Packing Computer 107, Mobile Device 111, and Computer 113 may include or be connected to a Graphical User Interface (GUI). In FIG. 1, a GUI 109 is shown coupled to Packing Computer 107, while a GUI is integrally formed with Mobile Device 111 and Computer 113. A GUI may be used to display results of the methods implemented by the software platform of API Host Server 101, which may include an optimized packing solution. The optimized packing solution may be displayed in form of a visual illustration or representation of a packing instruction via GUI 109. A GUI may also be used by a user to provide inputs and conduct API calls to API Host Server 101, or to manipulate the results.

In one embodiment, API Host Server 101 may comprise: a ranking unit, a layout determiner, a layout visualizer, and a packing instructor. The ranking unit is configured for ranking products based on at least one of the weight and dimension information of each to generate a first ranking list, and ranking containers based on their dimension information to generate a second ranking list. The layout determiner is configured for determining, based on the first and second ranking lists, a plurality of layout configurations for packing the products into at least one container selected from the containers, and selecting a layout configuration from the plurality of layout configurations based at least partially on a rate table. The selected layout configuration minimizes a cost of shipping the products. The layout visualizer is configured for generating a visual illustration of the layout configuration. The packing instructor is configured for providing the visual illustration as the packing instruction to the user via the GUI. In another embodiment, the packing instructor is located at Website Host Server 103 for providing the visual illustration as the packing instruction to the user via the GUI.

API calls or processing requests sent to API Host Server 101 may include all information required for the software platform to produce a result. However, in some embodiments API Host Server 101 is coupled to a Database 105 that may store additional rules, optimizations, information, and data regarding the API calls. For example, a request from Packing Computer 107 to API Host Server 101 may require that API Host Server 101 retrieve some data from Database 107 in order to be able to process the request and produce a result. As examples, Database 107 may store carrier rate tables, product information (such as product dimensions, weight, and packing rules), packing rules, and optimization features.

In one embodiment, a request from Packing Computer 107 to API Host Server 101 may require that API Host Server 101 retrieve some data from a third party or a shipping carrier in order to be able to process the request. The data may include a rate table specially offered by the shipping carrier to the user or shipper. As such, the API Host Server 101 can remotely work with a third party server in concert to generate a visualized packing instruction based on a cost-optimal solution determined by methods and algorithms discussed below.

In some embodiments system 100 may comprise additional equipment (not shown) for measuring, determining, or estimating the dimensions and weight of an item to be shipped. For example, Packing Computer 107 may be coupled to a scanner that scans an item to determine its dimensions, or a scale that weighs the item to determine its weight. Those dimensions may then be used in the request sent to the API Host Server 101 to establish an optimal packing solution.

In alternative implementations, the API Host Server may be positioned on site at a packing and/or shipping facility and locally accessed. Local devices such as computers are then able to conduct API calls to access and run the methods implemented by the software platform that implements the disclosed methods.

Depending on the connection speed between the API Host Server and a requesting computer, most API calls are returned in an elapsed time on the order of 1 to 10 milliseconds per packed item to enable a real-time packing instruction request and response. The provided service may be stateless, indicating that each API call is processed without regard for previous calls.

The methods implemented on the above system determine optimal packing of items to be shipped by considering not just the 4D characteristics of the items, but also one or more of the following factors: shipping carrier rate tables, shipping carrier zones, shipped products, containers for shipping, a specific shipment deal, and shipping carrier dimensional factors. For example, a rate table may include shipping rates determined based on specific discounts and variations among different containers from a same carrier. A very large carton may have a rate table with associated oversize fees added into a per-pound rate increase; while another carton may have a negotiated rate for only its specific dimensions, e.g., a shipper has a high volume of 12×12×12 cartons such that they can fill a whole truck predictably, and the shipping carrier rewards this with a negotiated discount for these cartons.

Figure 2:
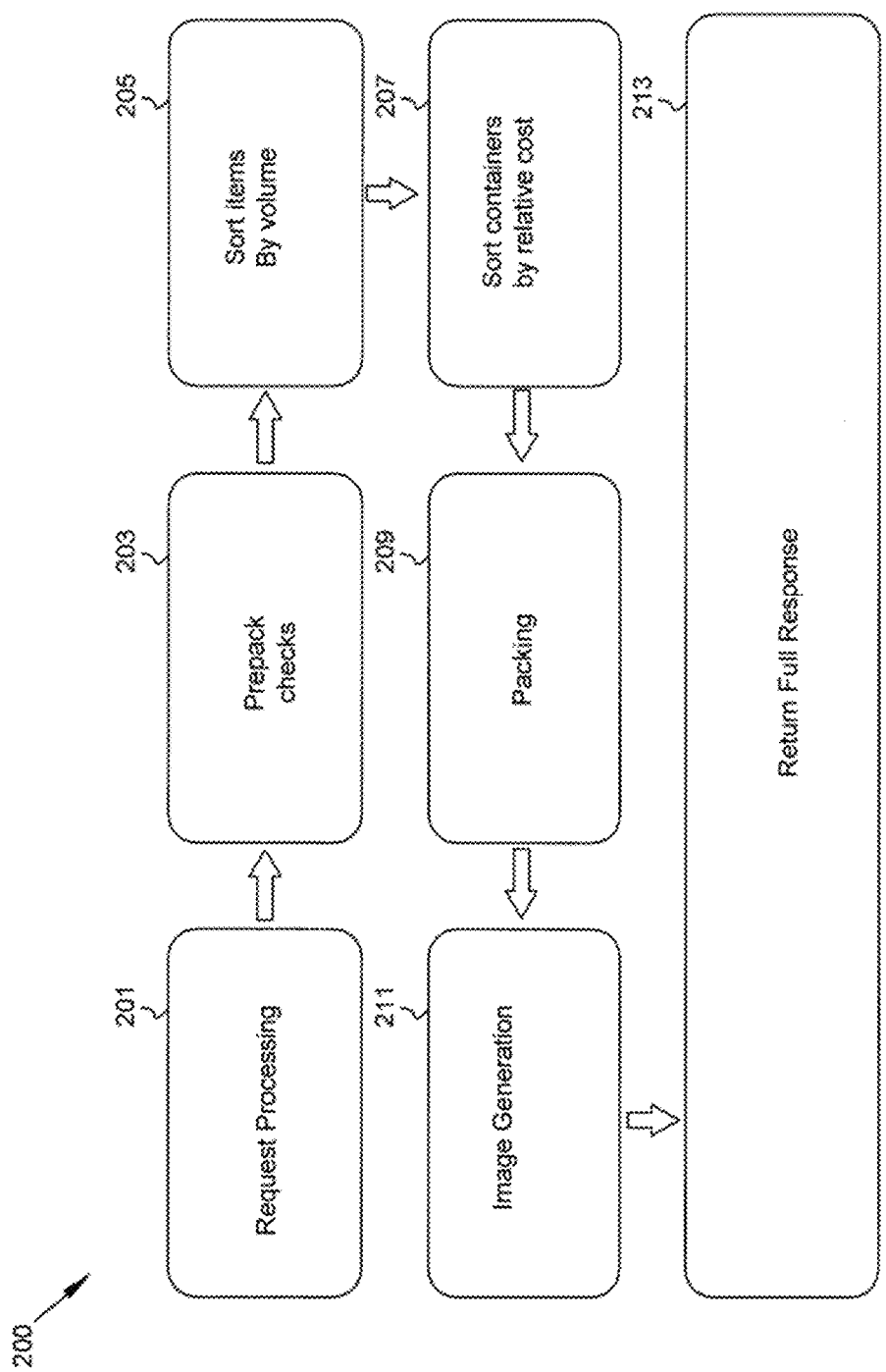
FIG. 2 is a flow diagram of a method for providing a visualized packing instruction, in accordance with various embodiments of the present disclosure.

FIG. 2 is a flow diagram of a method 200 for providing a visualized packing instruction, in accordance with various embodiments of the present disclosure. Method 200 begins at operation 201, when a request for processing, i.e., an API call, is made. A processing request typically requires authenticating the user and/or user request and validating that the request is feasible.

Rules may be assessed at operation 201 as well. The present disclosure allows for various limitations to be accounted for with rules. For example, SKU characteristics that may affect packing include: pack alone, cohort (keeping like items together), stacking (items that stack together to reduce volume), rolling (items that roll together to reduce volume or alter dimensions), pallet allowable overhang, and void/fill (space left for packing material).

Optimization rules may also be assessed at operation 201. For example, optimization may require consideration of additional packing factors such as, but not limited to, a selected or preferred shipping carrier, a dim factor, rate tables, placement strategies, carton cost, and bin distance. Other factors may include the cost of packing materials, labor cost of packing, shipping rates for variable dimensional weights, and whether items to be shipped may be separated. Placement strategies may include complex packing and assembly requirements, such as requiring boxes to be interlocked (e.g., a brick pattern) on a pallet. Bin distance may be used to split up orders within a packing warehouse to increase worker efficiency by decreasing worker overlap and overload.

An optimized solution in the context of the disclosed system and methods is typically a cost-optimal solution. Through the present disclosure, a cost-optimal solution refers to a solution that is optimal for packing products or items based on a method or algorithm disclosed in various embodiments, based on various parameters that are set up as default, input by a user, or calculated based on user preference or previous behaviors. Items to be shipped are sorted into packages that are optimized against carrier rate tables and dim weight rules to achieve the lowest cost shipping solution. However, in some embodiments a packing and shipping solution may be optimized for volume, weight, density, quantity of packages, or any number of other factors.

Prepack checks are conducted at operation 203. During prepack checks items can be passed in either assuming they will be shipped in their existing packaging or may already be placed in specific containers. At operation 205, items are sorted by the user-specific item sort, which typically results in a volume descending order of the items. In other embodiments, the results may be ranked in other orders, e.g., by the longest single dimension of the items, by the largest cross section of the items, by the highest weight of the items, etc. At operation 207, containers are sorted in an order of ascending relative cost, and overrides may be applied, for example, on the basis of total rate, rate per unit volume, or rate per unit weight. In other embodiments, the containers may be ranked in other orders, e.g., by an ascending order of additional cost to add next product in the containers, by an ascending order of cost per product in the containers, etc.

Virtual packing is conducted at operation 209. The virtual packing process follows a series of objective rules to place the items to be shipped in a container. New containers are "opened" as necessary, and items are virtually placed in containers according to rules and optimizations. Valid solutions are determined and method 200 proceeds to operation 211.

Arriving at a cost-optimal solution through virtual packing generally requires iterating, for each item, over existing, non-full containers. A first item is placed in a first container, and a volume remaining is determined. A second item is then evaluated to see if it will fit in the first container; if so, it is placed in the first container and a new volume remaining is determined. If not, the second item is placed in a newly-opened second container. The process continues with placing subsequent items in an existing box or opening a new box. Items are typically placed in volume descending order. Containers are typically sorted and reviewed for item placement in ascending order of volume remaining (i.e., the most full container is reviewed first to determine if the next item will fit).

Figure 3:
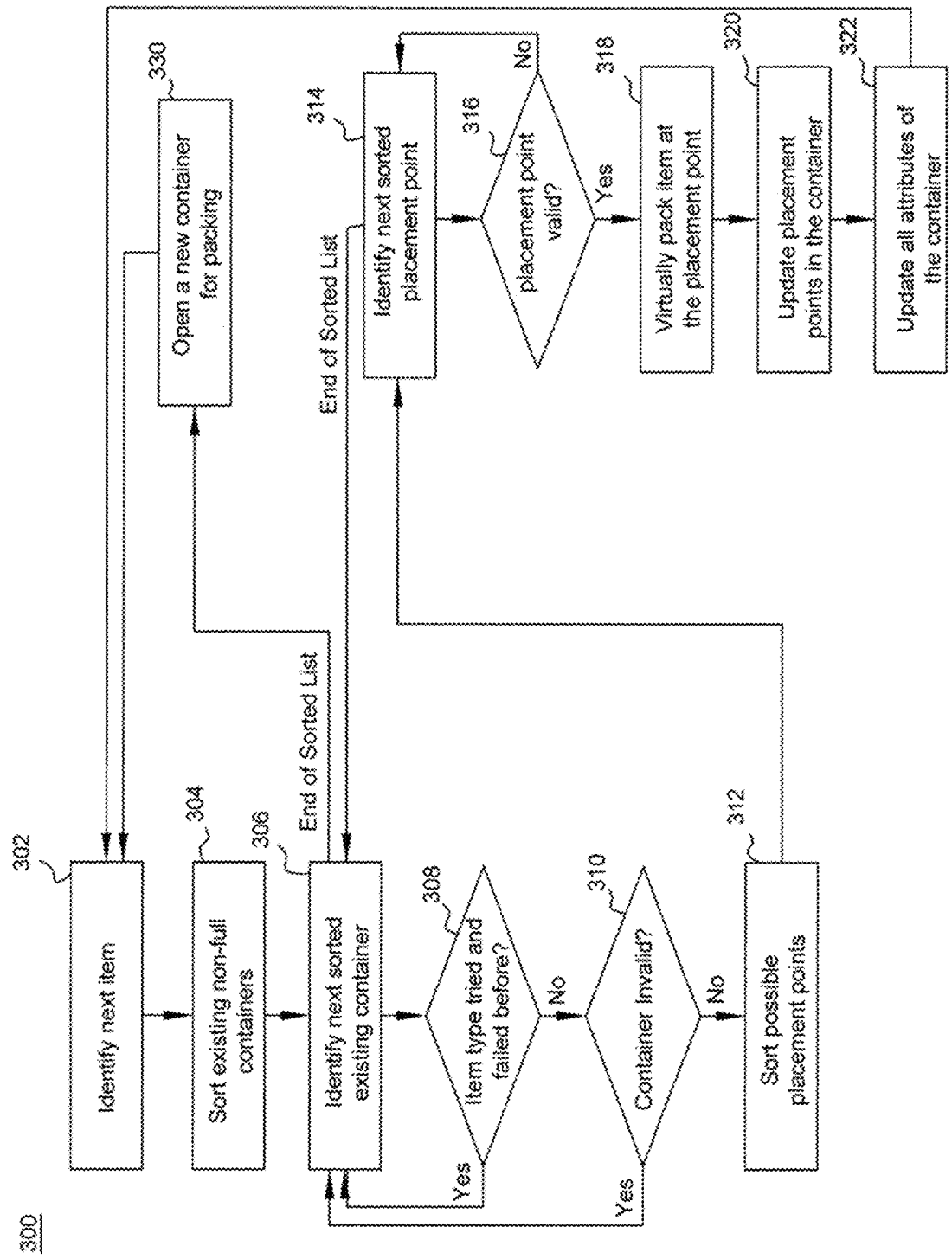
FIG. 3 is a flow diagram of a process of virtual packing, in accordance with various embodiments of the present disclosure.

FIG. 3 shows a detailed flow diagram of a process 300 for virtual packing, in accordance with various embodiments of the present disclosure. Process 300 may be at least part of operation 209 as shown in FIG. 2. Process 300 iterates over all sorted items and performs the operations for each item. As shown in FIG. 3, the next sorted item is identified at operation 302. Then at operation 304, existing containers are sorted, e.g., by ascending order of volume remaining, where the fullest container is sorted first. The existing containers are containers that have already been "opened" and have items placed within them. After sorting the existing containers to generate a sorted list, the next sorted existing container in the sorted list is identified at operation 306. Then at operation 308, it is checked whether the item type of the current item has been unsuccessfully attempted to be packed in this container before. If so, the process goes back to operation 306 to identify the next sorted existing container. If not, the process goes to operation 310, where it is checked whether the container is invalid. A container may be invalid when it has insufficient weight or volume remaining, or when the contents in the container are incompatible with the current item and its rules and restrictions. For example, the container contains items excluded from being packed with the current item. If it is determined at operation 310 that the container is invalid, the process goes back to operation 306 to identify the next sorted existing container. If it is determined at operation 310 that the container is not invalid, the process goes on to operation 312 to attempt three-dimensional placement.

At the operation 312, possible placement points are sorted to generate a sorted list, either by default or overridden option. A default point order priorities item placement in the "back bottom" corner of the container, which is referred to as coordinates (0, 0, 0). Possible placement points are maintained at boundaries of currently placed items within the container. Then the process will iterate over the sorted placement points. At operation 314, the next sorted placement point is identified. At operation 316, it is checked whether the placement point is valid. For example, item dimensions at the placement point may be checked at operation 316 versus container bounds; or item constraints may be checked at operation 316 versus its neighboring items. Rules such as allowable item overhang or item fragility may be checked at operation 316 as well. If it is determined at operation 316 that the placement point is not valid, the process goes back to operation 314 to identify the next sorted placement point. If it is determined at operation 316 that the placement point is valid, the process goes on to operation 318 to virtually pack the item at the placement point in the container. Then at operation 320, placement points are updated in the container, by removing now-invalid points that are, e.g., blocked by the new item, and adding new placement points which may be defined by the boundary of the new item's dimensions. At operation 322, all attributes of the container packed in are updated. The attributes may include, e.g., the volume utilization, weight utilization, and the predicted cost of the container. The process then goes back to operation 302 to pack the next item until all items are either virtually packed or no valid placement is found to exist.

In one embodiment, if it is determined at operation 316 that the placement point is not valid, the process may include an operation of changing the orientation of the item and retry the placement point. In another embodiment, if operation 314 reaches the end of the sorted list of placement points, the process may include an operation of changing the orientation of the item and retrying all placement points. In yet another embodiment, if operation 314 reaches the end of the sorted list of placement points, the process goes back to operation 306 to identify the next sorted existing non-full container.

In one embodiment, at operation 304, after existing containers are pre-sorted, e.g., by ascending order of volume remaining, an algorithm or sub-process may be used to perform operation 304 to sort existing containers based on cost. Using cartons as an example of containers, the algorithm sorts existing cartons by cost. According to one embodiment, the inputs of the algorithm include: (1) nextItem, which represents the next item from a list of unpacked items, sorted by user-defined sequence or volume descending, and having dimensional information; (2) a list of existing cartons having dimensional information, partially filled with existing items, including a function pack(i) that attempts a three-dimensional, rule-constrained pack of item i in the carton, and optionally including a flatCost and/or a rateModel(w) defined for each available carton, referred to as availableCartons; and (3) goal, which represents the goal of the packing solution, e.g., either most-items or lowest-cost.

In this embodiment, rateModel(w) is a shipment-detail-specific and carton-specific function that returns the estimated rate (cost) of a carton considering order details, additional services, delivery date obligations, insurance, shipping distance, fuel cost, and other factors, dependent upon the estimated final carton weight w; the flatCost is a shipment-detail-specific and carton-specific static cost associated with the materials, fixed surcharges, flat rates, and other factors, for the carton, strictly independent of the estimated final carton weight w. To wit, cost is estimated by the sum of rateModel(w) and flatCost. If both values are 0, the carton volume is substituted as the flatCost. In one example, a goal of most-items selects cartons to maximize the count of items packed in each carton, and uses volume-based methods. In another example, a goal of lowest-cost minimizes deltaCost, or the cost increase caused by nextItem. The deltaCost is found by rateModel(wt)-rateModel(w0), where w0 is the weight of the carton as currently packed, and wt is the weight of the carton including nextItem.

According to one embodiment, the outputs of the algorithm include: a subset of availableCartons, with cartons found unacceptable removed, ordered by deltaCost and then by carton item count, i.e., the lowest additional cost to add nextItem, referred to as bestCartons.

An example of the algorithm, called SortExistingCartonsByCost, that can realize operation 304 is shown below, where only a goal of lowest-cost is explored for simplicity.

```
1.  let cartonCosts be a list, with an entry for each carton in availableCartons.
2.  for each carton in availableCartons do
3.     let currentWeight be carton.currentWeight
4.     let cartonCost be carton.flatCost + carton.rateModel(currentWeight)
5.     let cartonCostWithNextItem be carton.flatCost + carton.rateModel(currentWeight + nextItem.weight)
6.     let deltaCost be cartonCostWithNextItem − cartonCost
7.     push [carton, deltaCost] onto cartonCosts
8.  end
9.  let bestCartons be cartonCosts sorted by deltaCost ascending then carton.itemCount descending
```

The above algorithm can determine which of the existing cartons, possibly partially filled with items already packed inside, are optimal for the next item. This is essential to the virtual packing process because, if, e.g., a carton has a 20-pound dimensional weight, and only 3 pounds of existing items inside, every additional item added to that carton is effectively free until reaching 20 pounds, the 20-pound rate already being paid for.

In one example, in attempting to pack nextItem with a weight of 2 pounds, there are two cartons, carton A and carton B, in availableCartons, each with a single 1-pound item inside. Due to differing dimensions between carton A and carton B, there are two different rateModel(w) functions. Carton A has a dimensional weight of 10 pounds, and a rate of $1 per pound, that is, cartonA.rateModel(w)=max(w, 10 pounds)*$1. Carton B has a dimensional weight of 2 pounds, and a rate of $4 per pound, that is, cartonB.rateModel(w)=max(w, 2 pounds)*$4. At their current weights, their rates are evaluated, yielding a total cost of $18, because: costA0=cartonA.rateModel(1 pound)=max(1 pound, 10 pounds)*$1=$10; and costB0=cartonB.rateModel(1 pound)=max(1 pound, 2 pounds)*$4=$8.

To determine whether nextItem should prioritize its packing in A or B, use the above algorithm SortExistingCartonsByCost, simplified below. In this example, as deltaCostA is $0, packing nextItem in A is effectively free, so A is prioritized above B. This case happens often in real-world shipping due to intrinsic dimensional weights that incur a high initial rate even with very little loading.

let nextItem.weight be 2 pounds deltaCostA=cartonA.rateModel(1 pound+ nextItem.weight)−costA0=max(3 pounds, 10 pounds)*$1−costA0=$10−costA0=$10−$10=$0 deltaCostB=cartonB.rateModel(1 pound+ nextItem.weight)−costB0=max(3 pounds, 2 pounds)*$4−costB0=$12−costB0=$12−$8=$4

In one embodiment, if the operation 306 reaches the end of the sorted list of existing non-full containers, the process goes to operation 330 to open a new container for packing the item. The process goes back to operation 302 after the item is packed into a new container, and iterate over all remaining items until all items to be shipped are virtually packed or determined to be a leftover, as discussed in detail below.

Figure 4:
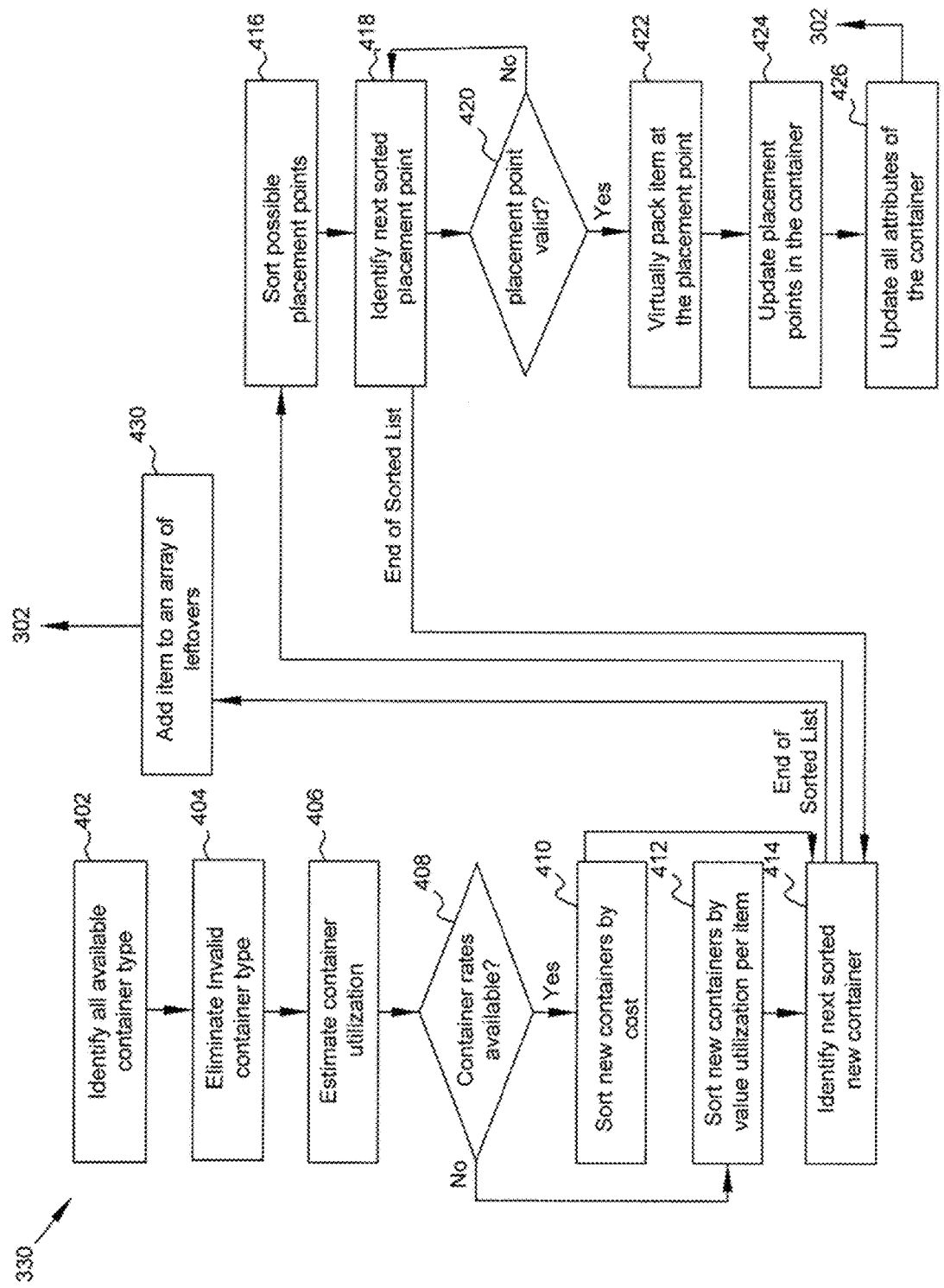
FIG. 4 is a flow diagram of a process of opening a new container for packing, in accordance with various embodiments of the present disclosure.

FIG. 4 shows a detailed flow diagram of operation 330 of opening a new container for packing, in accordance with various embodiments of the present disclosure. Operation 330 in this example is performed to evaluate all potential container types to determine the optimal container to "open" for this and subsequent items after determining that no valid placement was found in any existing container. As shown in FIG. 4, all available container types are identified at operation 402. Then at operation 404, invalid containers or container types are eliminated. Similar to operation 310, a container may be invalid when it has insufficient weight or volume remaining, or when the container is incompatible with the current item and its rules and restrictions. For example, the current item requires additional packing materials that exceed the container dimensions, though the item does not. After eliminating invalid containers, the process goes to operation 406 to estimate container utilization for current and subsequent items based upon item and container attributes. In one embodiment, the operation 406 includes a sub-process, which runs operations 302-322 for the remaining items only, without opening a new container via the operation 330. This sub-process can run once for each available container to generate a sorted list of bestCartons. In various embodiments, the sub-process of the operation 406 stops when it encounters a NO answer at the operation 310 or an End of Sorted List at the operation 314, or when all remaining items have been packed in the sub-process container.

At operation 408, it is determined whether container rate information is available. If so, the process goes to operation 410 to sort new containers by cost, e.g., using cost effectiveness per item packed as the sort value, and then goes to operation 414. If not, the process goes to operation 412 to sort new containers by value utilization per item packed, and then goes to operation 414. The default value utilization may be measured in terms of cost or volume, while weight or labor effort may also be used.

After sorting the new containers to generate a sorted list at operation 410 or operation 412, the next sorted new container is identified at operation 414. If operation 414 reaches the end of the sorted list of new containers, the process goes to operation 430 to add the item to an array of leftovers, which means the item is unable to be packed because no valid placement was found in any existing or non-existing (new) container. If operation 414 does not reach the end of the sorted list of new containers, the process goes to operation 416 to attempt three-dimensional placement of the item in the newly opened container. The operations 416-426 are performed similarly to the operations 312-322 as shown in FIG. 3 and as discussed above. After finding a valid placement point at operation 420 and packing the item into the new container at the valid placement point at operation 422, placement points are updated in the new container at operation 424, and all attributes of the new container are updated at operation 426. Then the process goes back to operation 302 in FIG. 3, to identify the next item for packing, until all items to be shipped are either packed or put into a leftover queue. If no valid placement was found in the current new container, the process goes back to operation 414 to identify the next sorted new container, until all sorted new containers are tried, which means the item needs to be put into the leftover queue at operation 430. After the item is put into the leftover queue at operation 430, the process goes back to operation 302 in FIG. 3, to identify the next item for packing, until all items to be shipped are either packed or put into the leftover queue.

In one embodiment, an algorithm or sub-process may be used to perform the operation 410 to sort new containers by cost. Using cartons as an example of containers, the algorithm determines which kind of new carton to open to arrive at a cost-optimal solution, if the next item cannot be placed into any existing cartons. According to one embodiment, using the algorithm called SelectCartonByCost, the disclosed method receives inputs of: (1) nextItems, which represents a list of unpacked items, sorted by user-defined sequence or volume descending, and having dimensional information; (2) a list of cartons having dimensional information, and optionally also including a flatCost and/or a rateModel(w) defined for each available carton type, referred to as availableCartonTypes; and (3) usableSpace, which represents an estimate of average volume efficiency of the final packing.

In this embodiment, the rateModel(w) is a shipment-detail-specific and carton-specific function that returns the estimated rate (cost) of a carton considering order details, additional services, delivery date obligations, insurance, shipping distance, fuel cost, and other factors, dependent upon the estimated final carton weight w; the flatCost is a shipment-detail-specific and carton-specific static cost associated with the materials, fixed surcharges, flat rates, and other factors, for the carton, strictly independent of the estimated final carton weight w. To wit, cost is estimated by the sum of rateModel(w) and flatCost. If both values are 0, the carton volume is substituted as the flatCost. One or more of these inputs may be provided in an API call to API Host Server 101, or may be retrieved from Database 105. Cartons are virtually selected and loaded with consideration of a carton flat cost and a carton rate model. Estimates of the carton flat cost and carton rate model depend on details of the order and shipment as provided in an API call to API Host Server 101. Such details may include negotiated customer rates.

According to one embodiment, the outputs of the algorithm include: the lowest cost-per-item carton type, and if required, that with the highest item count therein, referred to as bestCarton. An example of the algorithm, called SelectCartonByCost, that can realize operation 410 is shown below.

```
1.  let cartonCosts be an empty list of carton types with placeholders for costs.
2.  for each carton in availableCartonTypes do
3.      # set all the initial conditions of an empty carton with its lowest possible cost
4.      let currentWeight be 0
5.      let cartonCost be carton.flatCost + carton.rateModel(currentWeight)
6.      let remainingWeight be carton.maxAllowableWeight
7.      let remainingVolume be carton.maxAllowableVolume * usableSpace
8.      let itemCount be 0
9.      for each item in nextItems do
10.         remainingWeight <- remainingWeight - item.weight
11.         remainingVolume <- remainingVolume - item.volume
12.         if remainingVolume < 0 or remainingWeight < 0 then
13.             # the process estimated the carton cannot contain the next item.
14.             break
15.         end
16.         # the current item has been estimated to fit, so update the current attributes
17.         # of the carton and calculate its new per-item cost
18.         itemCount <- itemCount + 1
19.         currentWeight <- currentWeight + item.weight
20.         cartonCost <- (carton.flatCost + carton.rateModel(currentWeight)) / itemCount
21.     end
22.     push [carton, cartonCost, itemCount] onto cartonCosts
23. end
24. sort cartonCosts by cartonCost ascending then itemCount descending
25. let bestCarton be first carton from sorted cartonCosts
26. return bestCarton
```

In the above example, the loop of lines 9-21 of the process represents a simplified evaluation of the "fit" of an item within a carton, and the process may instead utilize a sub-process, including only nextItems, implementing the full, 4-dimensional fit method as described in operations 302-322. Given real-world rate models, such as a parcel carrier's weight-to-rate model, it is not always best to minimize based upon total carton volume per item packed. The following examples demonstrate how differing carton and item parameters can affect optimal cartonization as determined by the process.

In a first example, there are two items in nextItems to be packed, with dimensions of 12 inches to a side, and a weight of 50 pounds apiece. The cartons in availableCartonTypes to be chosen from are a 12-inch cubic box called A, or a 24 by 12 by 12 inch box called B, with a maximum weight of 150 pounds apiece. Assuming the availableCartonTypes lack a function describing their predicted cost for a given weight w, rateModel(w), and a static cost associated with the carton, flatCost, the process will instead substitute the average volume utilization per item for the average predicted cost for the item, and will in this way find its optimal cartonization solution. Using volume alone, the typical method of solving cartonization optimization problems is seen. The items can either fit in 2 A cartons, filling them completely, or in a single B carton with both items, filling it completely. In both cases, the cost per item is found by using the average volume utilized per item. That is, Cost_Per_Item A=Cost_A/Item_Count_A, and Cost_Per_Item B=Cost_B/Item_Count_B, where Cost_A=Volume_A=12*12*12=1728 cubic inches, Item_Count_A=1, Cost_B=Volume_B=24*12*12=3456 cubic inches, Item_Count_B=2, which yields that: Cost_Per_Item_A=1728/1=1728 cubic inches per item, and Cost_Per_Item_B=3456/2=1728 cubic inches per item.

As the two costs in this example are equivalent, the option with a higher item count is selected, i.e., carton B. Moving beyond the volume-only example, it is found that there are more factors at play. It is important to consider that a cartonization solution may or may not change based upon further parameters used in carton selection, however it is essential to note that even in the cases where the solution remains unchanged, the reasons for the solution may differ. In these cases, it is just "lucky" that the volume-only cartonization solution returned an optimal result.

In a second example, both cartons have a flat cost associated. The physical cardboard carton A costs $4 for its materials, and carton B, being larger, costs $6. Using these flat costs instead of volume, Cost_Per_Item_A=Cost_A/Item_Count_A=$4/1=$4 per item, Cost_Per_Item_B=Cost_B/Item_Count_B=$6/2=$3 per item. The cost per item of carton B is clearly lower, so B should be used. In this case, the reason is purely monetary. It does not boil down to a tie-breaker for per-carton item count, avoiding the need of the "luck" of the volume-based method.

In a third example, it is assumed that a rateModel(w) function, applying to both A and B, is defined, drawn from a real-world parcel rate table, and rateModel(50 lbs) yields $17.69 and rateModel(100 lbs) yields $47.44. Based on reevaluation, each of the two A cartons has a weight of 50 lbs, as it contains a single item, and the single B carton has a weight of 100 lbs, as it has two items. Summing the estimated rate and the flat cost, Cost_A=rateModel(50 lbs)+$4=$17.69+$4=$21.69, Cost B=rateModel(100 lbs)+$6=$47.44+$6=$53.44. As such, Cost_Per_Item_A=$21.69/1=$21.69 per item, and Cost_Per_Item_B=$53.44/2=$26.72 per item.

In the third example, carton A would be strongly preferred, as $21.69 per item is 18.8% lower in cost than $26.72 per item. This non-linear rate scaling is common in industry practice, as parcels over a certain weight are typically more difficult to handle, and carriers charge increased rates. Without knowing this, B would be selected in almost all cases until a critical consideration of business rules guides the packing optimization process to select A. Seasoned shippers can frequently, though not infallibly, intuit such cases where a naive packing solution, i.e., the single B carton, is inferior to two A cartons, and this process seeks to improve upon the reliability and accuracy of such subjective judgments.

Based on the result of the third example, a human shipper may internalize that it is better to divide all completely full cartons into smaller, completely full cartons, creating a subjective rule of thumb to always ship 2, 100% filled A cartons over 1, 100% filled B carton. But in a fourth example, the items being shipped have a unit weight of 25 lbs, instead of 50 lbs. In this case, A cartons are 25 lbs each, and the B carton is 50 lbs. Given that rateModel(25 lbs) yields $12.79, it is calculated based on the above SelectCartonByCost algorithm that: Cost_A=rateModel(25 lbs)+$4=$12.79+$4=$16.79, Cost B=rateModel(50 lbs)+$6=$17.69+$6=$23.69. As such, Cost_Per_Item_A=$16.79/1=$16.79 per item, and Cost_Per_Item_B=$23.69/2=$11.85 per item. In the fourth example, B is the optimal choice, with $11.85 per item being 29.4% lower in cost than $16.79 per item. As B is no longer of an unwieldy size, meriting more expensive handling, rates are adjusted to favor the simplicity of shipping one carton over two for the same total weight.

As cartons are virtually filled with items during the process, the next carton selection is made by evaluating the next items to be shipped and determining their most cost-effective shipping carton. For example, if the next 10 items to be packed will fit into 10 cartons at $10 per carton (thus giving a pack cost of $10 per item) or may be fit into 2 cartons at $25 per carton (thus giving a pack cost of $5 per item), the process will open the 2 cartons at $25 per carton as the most cost-effective solution. Once those 10 items are packed into the 2 cartons, the process will move to the next items to be packed and will similarly evaluate the most cost-effective carton to open. Subsequent items may also be placed into previously, partially packed cartons.

Referring back to FIG. 2, at operation 211, image generation is conducted and processes are rendered for all items. Images or other visual representations of the optimized packing solution may be displayed to a user via a display or a GUI. Displays may be provided, for example, on a warehouse management computer that shows a pick and pack list, on a shipping computer to show a reference image that explains the packing solution and/or explains the shipping rates, or on an online shopping website to display an optimized shipping solution for items in a shopping cart. A shopping cart display may show selected items in cartons, and may be manipulated by a user. As items are added or removed from the shopping cart, the optimized shipping solution may be updated and a new display provided to the user. Display may also be provided to a customer when processing return shipping for items to be returned.

In some embodiments, based on visualization rules (e.g., 3-dimensional projection parameters, item colors, custom item value heat map options), all items are sorted in an ascending order of item face depth in projection. The result is item faces drawn back-to-front. Upon a request from the user, the system can re-evaluate projection ordering along a single packing axis for the container (e.g., "bottom-up loading"), and determine the non-obscuring depth ordering for all items along said axis, yielding a valid real-life placement order for items when a person is packing the container.

In some embodiments a user may use the GUI to view and modify the optimized shipping solution. For example, a user may be able to break apart items in a package, change package sizing, alter the dim weight, input an additional condition like weekend delivery, or take other actions that modify the optimized solution provided by the software on the API Host Server 101. Then, at operation 213, the full response is returned to the user to end method 200.

FIG. 5 illustrates an exemplary graphic user interface (GUI) 500, in accordance with various embodiments of the present disclosure. In one embodiment, GUI 500 may be the same as GUI 109 in FIG. 1. In this example, GUI 500 displays various information to the user, including a visual illustration 510 of a packing instruction within a container, as well as a table 520 listing detailed product item information for each item packed in the container. As shown in FIG. 5, in this example, there are 41 items packed into 12 containers. On the displayed page 1/12, Container 1 of the 12 containers is shown with visual illustration 510 illustrating what is contained and how to pack the items in Container 1. GUI 500 also shows information of Container 1, which has a container type called Extra Large Box 2, a container weight of 17 lbs 6.4 oz, and a container dimension of 6 inches by 15.75 inches by 14.125 inches. Table 520 in this example shows item information of different types of items packed in Container 1, e.g., item reference IDs, item dimensions, item weights, and item quantities.

Figure 6:
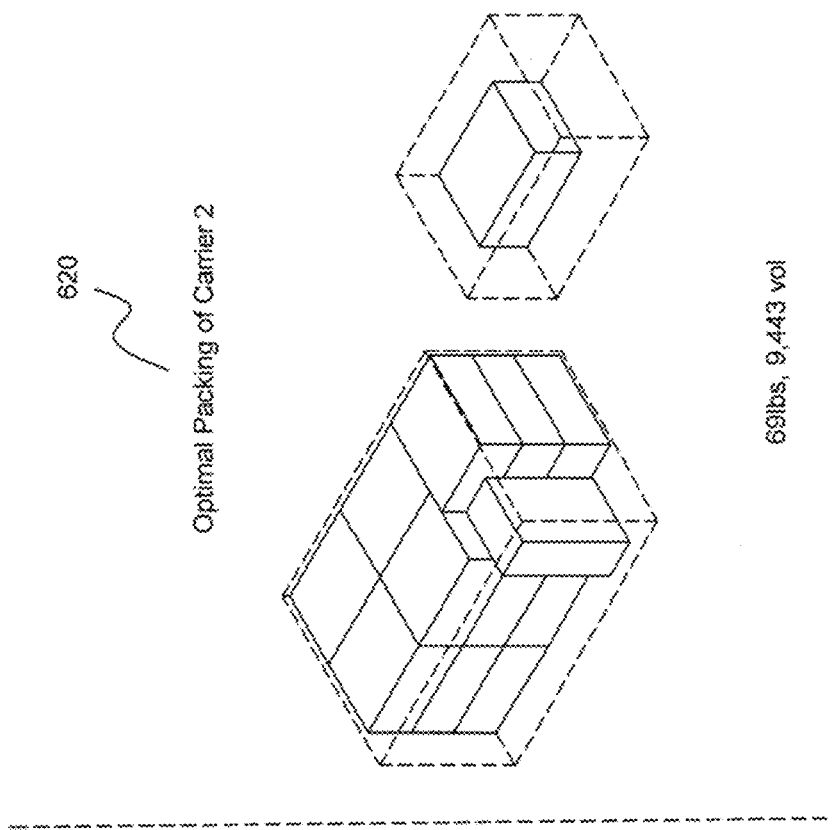
FIG. 6 illustrates a comparison of packing instructions based on different shipping carriers, in accordance with various embodiments of the present disclosure.
Figure 6:
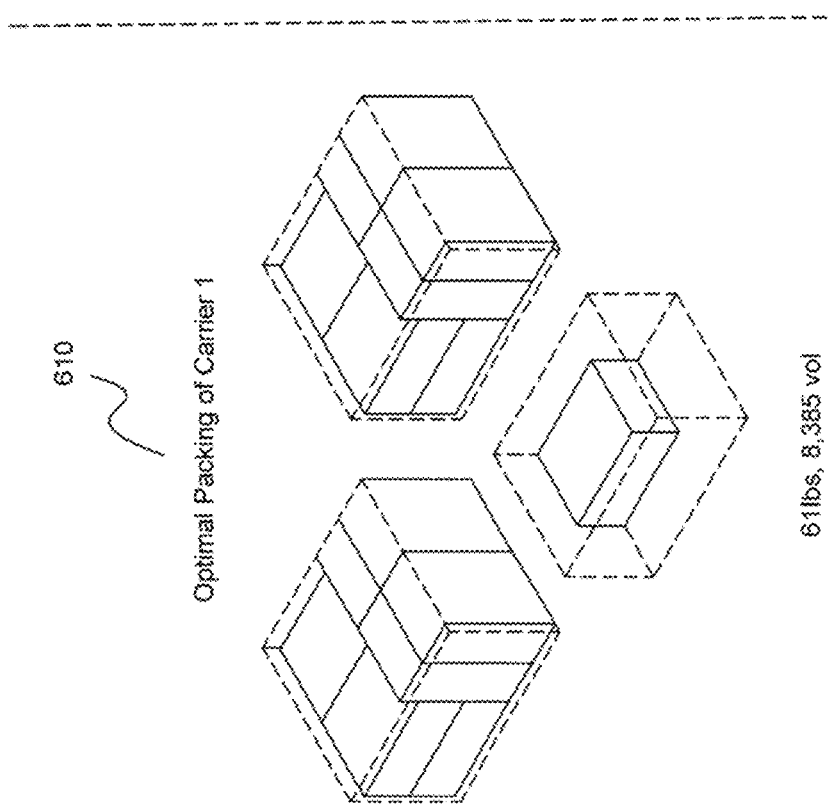

FIG. 6 illustrates a comparison of packing instructions based on different shipping carriers, in accordance with various embodiments of the present disclosure. A cost-optimal packing configuration may not be the same for two different carriers, because their rate tables have distinct quirks and do not scale the same way in pounds per zone. In this example, a user can submit a separate request for each carrier the user desires to rate shop. As shown in FIG. 6, two visual illustration results of packing instructions are returned separately for two different carriers. Visual illustration 610 shows an optimal packing instruction using Carrier 1, while visual illustration 620 shows an optimal packing instruction using Carrier 2. These results take carrier pricing characteristics into account automatically. Visual illustration 610 shows a packing with three containers, while visual illustration 620 shows a packing with two containers. As such, the two packing instructions, comprising visual illustrations 612, 620 respectively, may cause two different total weights and volumes, although the items packed are the same for the two packing instructions.

Figure 7:
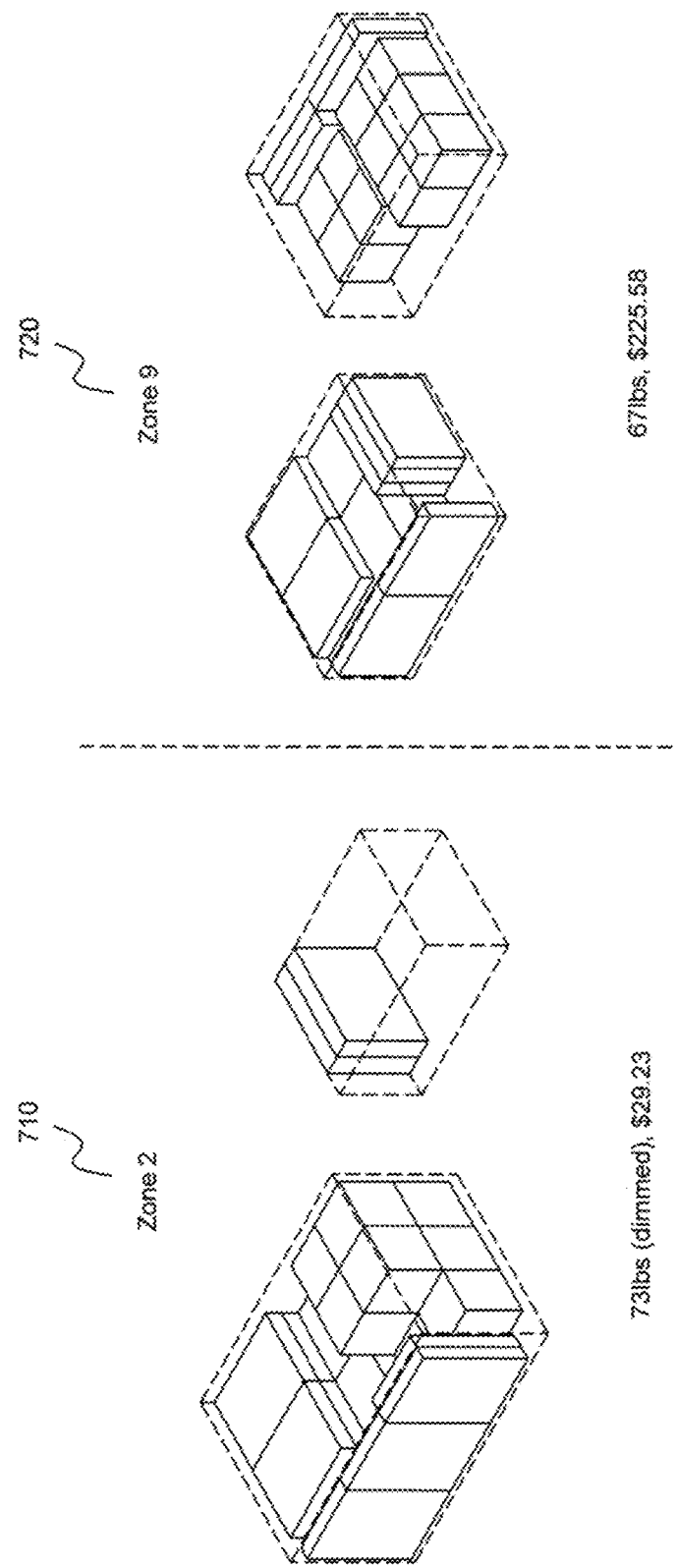
FIG. 7 illustrates a comparison of packing instructions based on different shipping destination zones, in accordance with various embodiments of the present disclosure.

FIG. 7 illustrates a comparison of packing instructions based on different shipping destination zones, in accordance with various embodiments of the present disclosure. A same carrier may have different biases from zone to zone. For example, a shipper is shipping two identical orders via a same carrier from a same origin, one to Zone 2 and one to Zone 9. For the order to Zone 2, there is a relatively high base box cost (e.g., $15), but relatively small price increases per pound (e.g., 25 cents/lb or 1%). This could mean the carrier would like a shipper to condense items into fewer (and/or smaller) boxes for Zone 2, maybe because fewer/smaller boxes are easier for their employees to actually process and carry. For the order to Zone 9, there is a base box cost of $65, but a higher relative per pound increases (e.g., $3/lb or 4%). This could mean that for long distance shipping (e.g., to Hawaii), the total weight is much more of a concern for the carrier than the number of boxes. In Zone 9, the carrier is providing a bias towards lower weight, dimensional weight or actual weight, presumably because it will go in a plane at some point, where weight is more of a factor.

As shown in FIG. 7, the system provides two visual illustration results of packing instructions for two different zones, based on the rate tables in the two respective zones. For Zone 2, visual illustration 710 suggests one large box and one small box, which represents the carrier rate bias (fewest boxes and then the smallest additional box if needed), even though in this case the shipment gets dim-rated, and the system yields a packing instruction of 73 lbs and $29.23 in total. In contrast, for Zone 9, where weight is the key factor, visual illustration 720 suggests two medium sized boxes in order to minimize weight, where a dimensional weight is still weight from a cost perspective. In this example, the biases in Zone 9 rates penalize dim-rated and very full cartons, and the system yields a packing instruction of 67 lbs and $225.58 in total. FIG. 7 shows the cheapest ways of packing for each of those zones. In case one uses these packing instructions in the wrong zones, e.g., if one took the packing instructions for Zone 9 and rated it for Zone 2, one would lose $0.24. In another example, if one took the packing solution for Zone 2 and rated it for Zone 9, one would lose $13.06.

While the above example in FIG. 7 considers shipping two identical orders from the same origin to two different destination zones, a zone-based rate optimization will consider both the origin zone and the destination zone, as well as the possible shipping methods between the two zones. In one example, shipping two identical orders from two different origin zones to the same destination zone can result in two different cost-optimal packing instructions. In another example, zone information may be modified or updated due to a shipping method change, e.g., from airplane to truck or vice versa. The shipping method change may be due to a holiday event, road construction, etc. In addition, zones may be divided not only based on geographical distances, but also based on transportation information connecting the zones, e.g., road distributions, river distributions, weather and climate, etc., and are ultimately governed by the shipping carrier.

Figure 8:
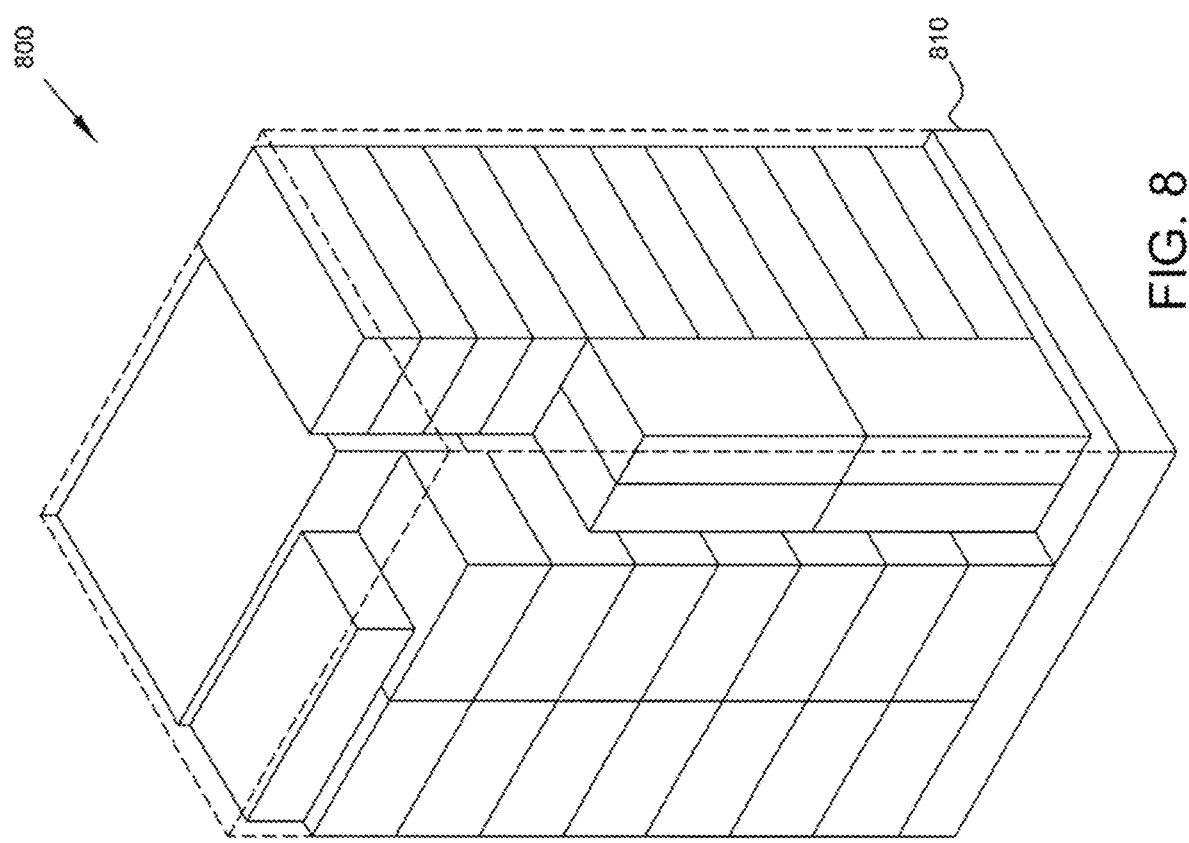
FIG. 8 illustrates an exemplary visualized packing instruction for packing products in a pallet, in accordance with various embodiments of the present disclosure.

FIG. 8 illustrates an exemplary visualized packing instruction 800 for packing products in a pallet, in accordance with various embodiments of the present disclosure. Pallets may be handled differently than other containers. In this example, the items are first packed into boxes, and then the resulting boxes are stacked on a standard full-sized pallet 810. Beyond normal rules, rules like allowable item overhang can be passed in the request to comply with customer-specific specifications, and cohort rules about keeping like items together can be used to ensure items are mostly packed together and not strewn about the container.

Figure 9:
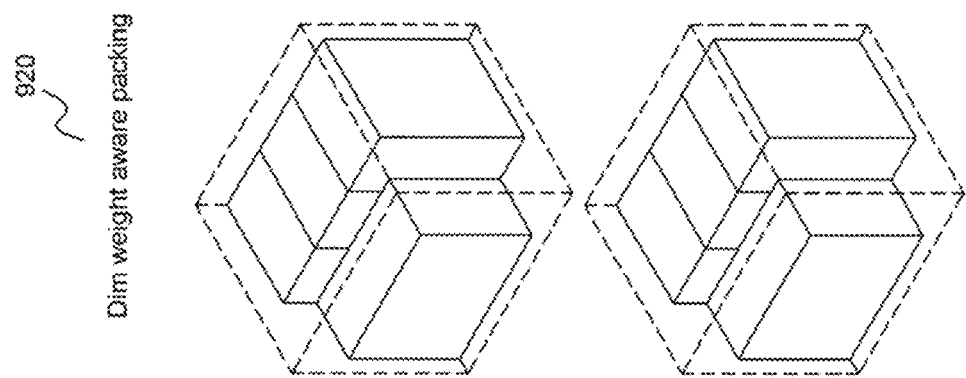
FIG. 9 illustrates a comparison of packing instructions with and without awareness of a dim weight, in accordance with various embodiments of the present disclosure.
Figure 9:
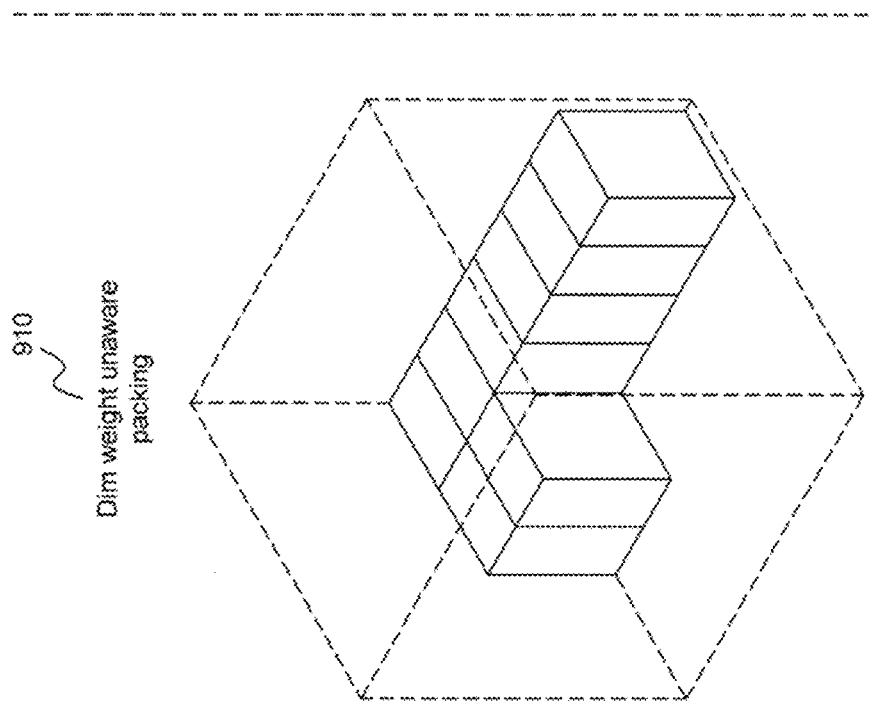

FIG. 9 illustrates a comparison of packing instructions with and without awareness of dim weight, in accordance with various embodiments of the present disclosure. Many shipping carriers will charge dimensional weight fees for low density packages. They determine whether a carton is low density by multiplying its length, width, and height, and then dividing the result by a special number called a dim factor. This is a carton's dimensional weight. The cost of a package is based on the higher of either its dimensional weight or actual weight. It can be difficult to manually and consistently avoid dim rate fees for several reasons: dim rate fees do not show up at time of shipping, but they are added to a shipper's monthly bill, which can make the cheapest solution deceptive during fulfillment. Because every carton has a minimum cost, there are times when taking a dim rating fee is cheaper than packing in multiple denser packages. Dim rating only applies in certain circumstances and zones. Different carriers may have differences in dim ratings.

In this example, two different visual illustrations 910, 920 are returned in response to two requests respectively, with the same item set. For visual illustration 910 showing a dim weight unaware packing, the dim factor is set to 100000 cubic inches per pound which effectively tells the system that density is not an issue, which causes the items to be packed in the fewest boxes possible. In contrast, for visual illustration 920 showing a dim weight aware packing, standard dim factors result in two boxes which are determined to be cheaper than one large low-density box in this case.

Figure 10:
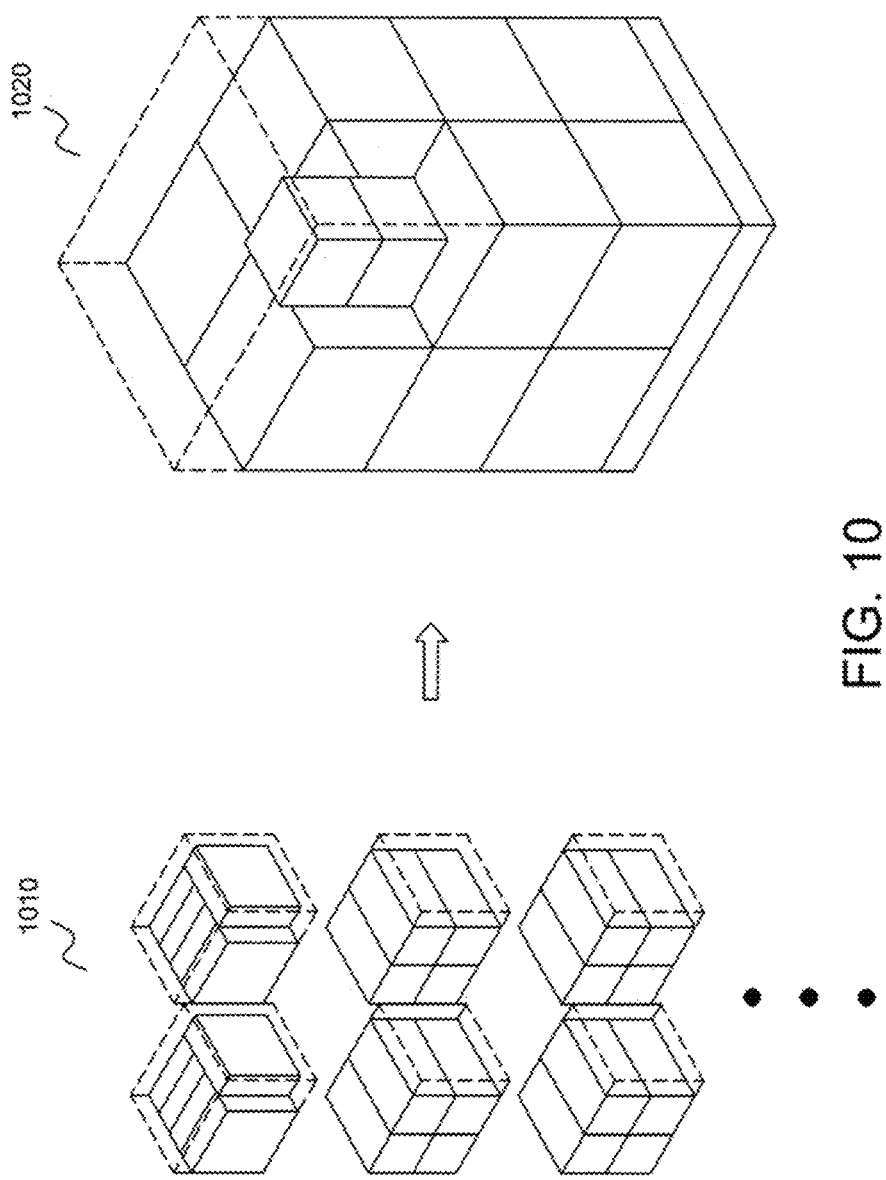
FIG. 10 illustrates an exemplary visualized packing instruction for packing products in cartons and packing the cartons into a pallet, in accordance with various embodiments of the present disclosure.

FIG. 10 illustrates an exemplary visualized packing instruction for packing products in cartons and packing the cartons into a pallet, in accordance with various embodiments of the present disclosure. Some shippers may ship larger orders via less-than-truckload (LTL) or truckload (TL) carriers. In these cases, it may be advantageous to predict the cost of shipping a pallet when only the line items are known. In two requests, a shipper can pack items to cartons and then to pallets. In this example, a visual illustration 1010 shows a packing instruction in response to a first request to pack items into containers or cartons; while a visual illustration 1020 shows a packing instruction in response to a second request to pack the resulting cartons from the first request into a pallet.

In one embodiment, a packing instruction may be optimized based on warehouse location when a bin number is submitted in the request. In a warehouse, workers are restricted to certain areas, while that area may shift slightly as needed to optimize labor utilization for a shipment. The packing instruction may then generate picking orders for workers that more intelligently strike a balance between economy of worker movement and shipping charges. For example, sending two pickers to adjacent aisles should be avoided, unless the packing instruction indicates that multiple containers need to be filled in those adjacent aisles.

The numerous advantages of the present disclosure will be readily apparent to one of skill in the art. Most notably, the present disclosure provides systems and methods that allow for cost optimization of packing and shipping solutions rather than simply attempting to pack and ship items in a minimal number of containers. The disclosed platform is flexible, allowing manipulation and adjustment of various rules, optimizations, and inputs to ensure a preferred output. The disclosed method considers a wide range of costs before arriving at an optimized solution; these costs include the relative cost of a carton per carrier zone at different weights, dimensional weight rates and carrier pricing factors, and efficiency of personnel in assembling the packing solution.

Additional features may be added to the system, including: more physical, mechanical modeling of containers and contents, fulfilling more use cases; center of gravity calculation and acceptable parameters; distributed load calculation; static analysis of container and item walls including failure parameters; item placement patterns and optimization towards industry loading practices, such as setting pallet orientations on a truck to optimize for unloading with a fork lift; increased compliance aspects, and improving the constraints that can be applied to items and containers to determine what is a valid placement and what is not.

In one embodiment, a customer or software system can send packing requests that at minimum have item and carton dimensions. In another embodiment, they send a separate request for each parcel carrier they are attempting to compare: the more optimization parameters that are passed through (carrier, zone, etc.), the more optimal the result is, as the real-time capabilities of the system allow for multiple requests with varying parameters to be compared to one another by a user, and a more optimal result may be discovered. This is very useful for calculating shipping during online checkout, where the shipping carrier may not yet be decided, or generating a pack list for warehouse fulfillment.

Figure 11:
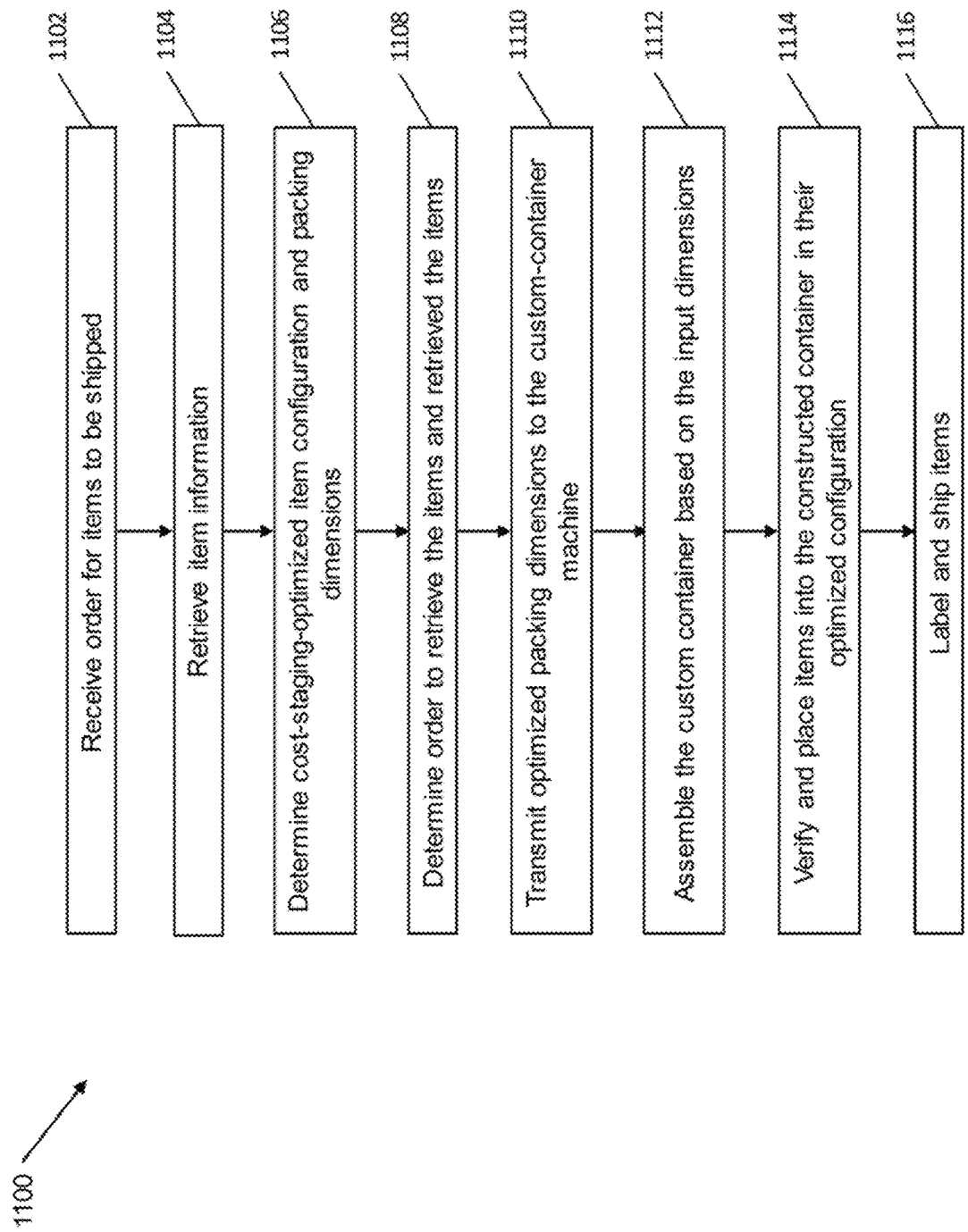
FIG. 11 is a flow diagram of a process of creating an optimized customized packing boxes, in accordance with various embodiments of the present disclosure.
Figure 12:
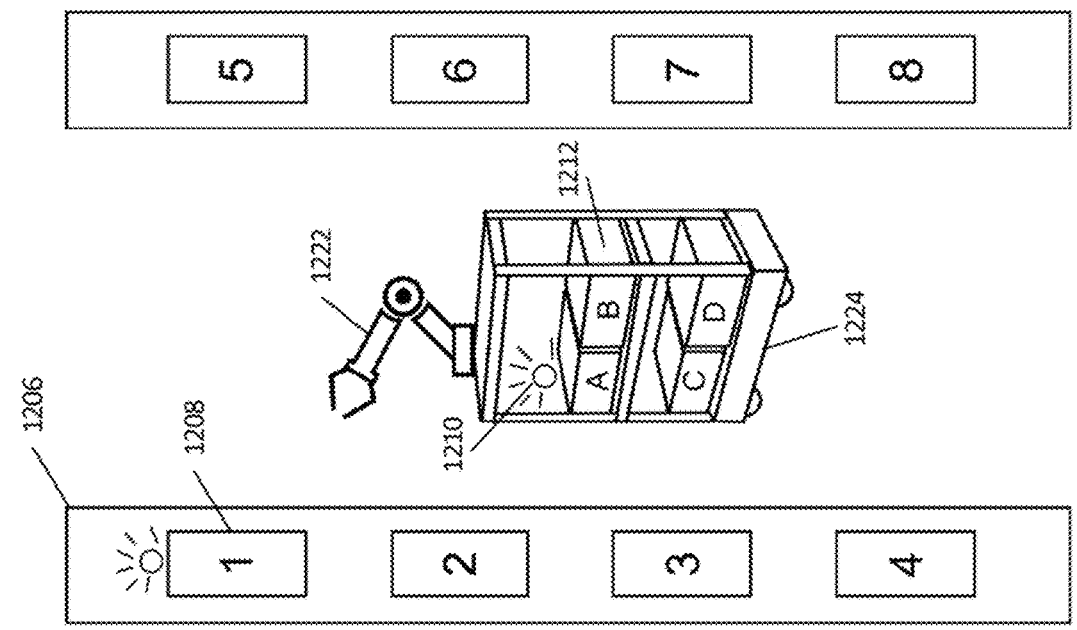
FIG. 12 illustrates an exemplary automated packing system for creating optimized customized packing boxes, in accordance with various embodiments of the present disclosure.
Figure 12:
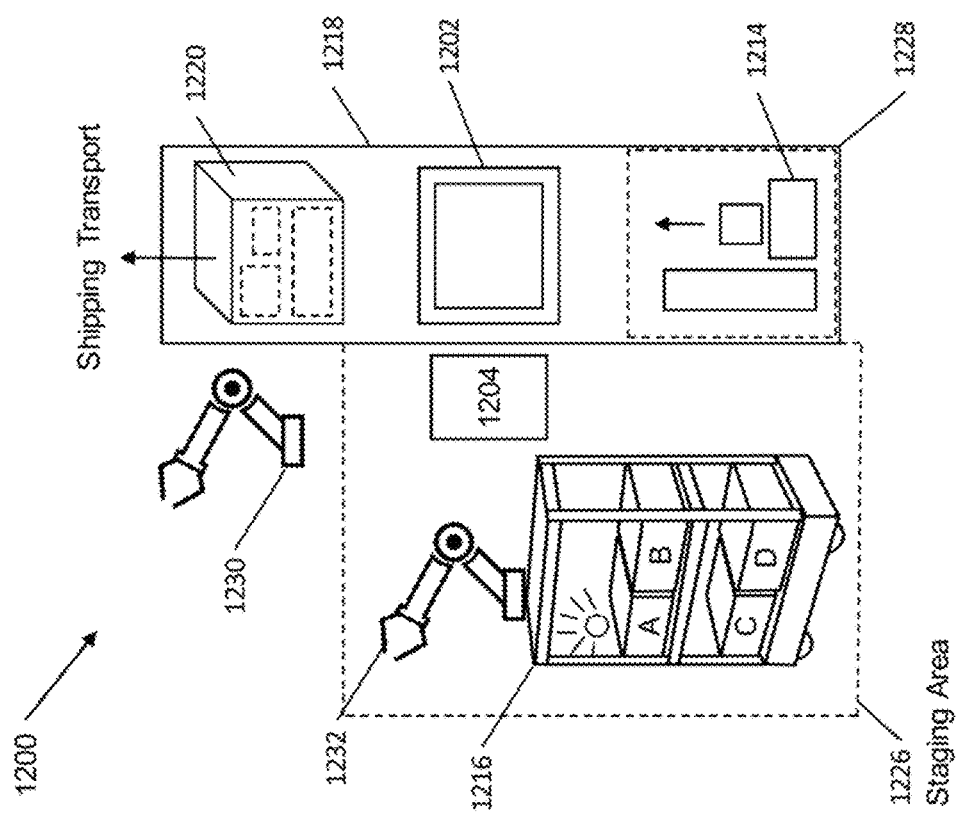
Figure 13:
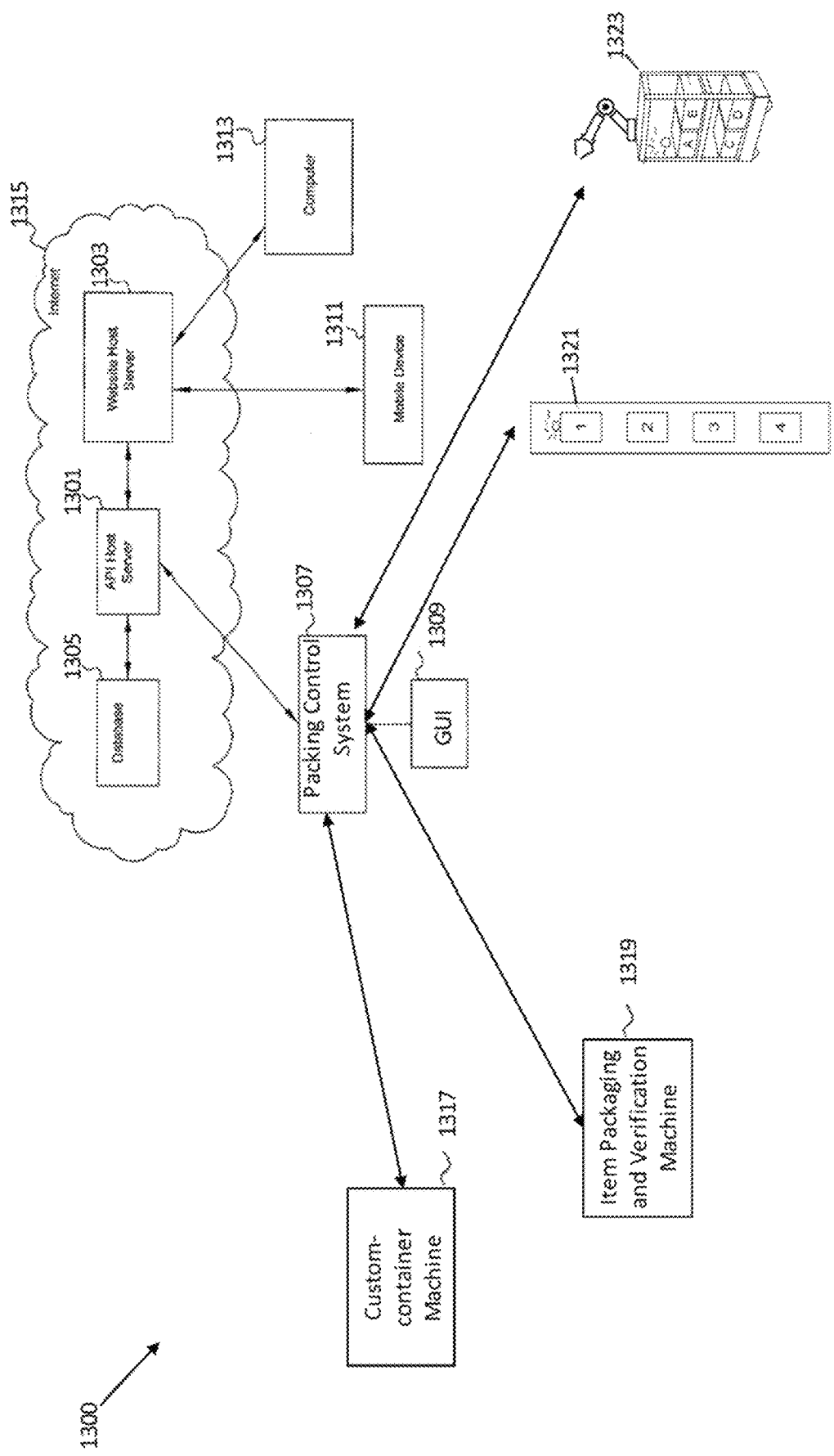
FIG. 13 is a schematic diagram of a system for implementing the presently disclosed subject matter, in accordance with various embodiments of the present disclosure.

FIG. 11 illustrates a process 1100 for optimizing shipping costs of custom-sized containers, in accordance with various embodiments of the present disclosure; FIG. 12 illustrates an automated packing system 1200 for implementing that process, in accordance with various embodiments of the present disclosure; and FIG. 13 is a schematic diagram of a system 1300 for implementing an automated packing system, in accordance with various embodiments of the present disclosure. In the non-limiting embodiments of FIG. 11-13, a Custom-Container Machine 1202 (1317) (e.g., a PackSize machine®) is used to create, on demand, containers of any dimension between a pre-determined range.

Currently, to use a Custom-Container Machine 1202, packing workers are grabbing items from their Retrieving Bin 1212 and subjectively grouping them together based on intuition and/or an arbitrary set of rules. Rules such as: place a maximum of three items in each container, have no more than two items side by side, and never have more than 24 inches between ends of an item. These arbitrary rules result in a significant amount of economic waste because they do not take into account any of the aforementioned factors that drive shipping costs e.g., shipping carrier rate tables, shipping carrier zones, shipped products, containers for shipping, a specific shipment deal, and shipping carrier dimensional factors, etc.

Furthermore, after the worker completes randomly grouping the items to be shipped, the worker simply determines the dimensions of the container the items are to be shipped in by measuring the dimensions of the grouped items and arbitrarily places the items in the container after it has been created. The packing worker, currently, gives no consideration to shipping costs during the packing process.

At present, the technical field of package engineering has no solution to the problem of how to construct a system that can effectively minimize shipping costs through proper item configuration and optimized container dimensions. The field of package engineering has continued to struggle with this technical problem because of the amount of pricing tables necessary to consider, the number of items to be processed, the speed the items need to be processed, the plethora of software systems working independent of each other, and the nearly infinite possible dimensions a custom-container machine can produce. However, as a novel solution to this technical problem, some embodiments of the present disclosure modify the algorithm of FIG. 3 and FIG. 4 such that it can be integrated into a specialized and automated packing system, an exemplar of which can be seen in FIG. 12. This modification allows the algorithm to minimize shipping costs by determining the ideal dimensions of shipping containers in addition to the ideal item groupings mentioned previously. As a result, some embodiments of the present disclosure have been shown to reduce shipping costs by over 10 percent on top of eliminating the labor costs associated with the workers that are currently employed to subjectively determine item groupings and measure necessary container dimensions.

In Step 1102, the Packing Control System 1307 receives an order from the API Host Server 1301 via, for example, the Internet 1315 comprising a list of one or more items to be shipped. In one embodiment, the API Host Server receives the order from a Web Host Server 1303 which in turn receives the order from a consumer's Mobile Device 1311 or Computer 1313 (e.g., interacting with an e-commerce website via a browser or app).

In Step 1104, once the items to be shipped are received by the Packing Control System 1307, information about the items such as: item weight, dimensions, packing restrictions, and bin locations is determined. In one embodiment, the item information is retrieved from remote Database 1305 by the API Host Server 1301 upon receiving the item order request. The API Host Server 1301 then transmits the item order and item information to the appropriate Packing Control System 1307. In other embodiments, the order may be entered manually into the Packing Control System 1307 through a GUI 1309 or received electronically via a third party server. In these embodiments, the Packing Control System 1307 can retrieve the item information directly from the remote Database 1305 or via a request to the API Host Server 1301. In some embodiments, the information about the items is transferred from the Packing System 1307 to the remote Database 1305 for faster access by the API Host Server 1301. In some embodiments the Database 1305 is accessed by the API host server through the Packing Control System 1307.

In Step 1106, the information about each individual item is utilized to determine an optimized manner of packaging the ordered items. In some embodiments, the item information is used to determine the most cost-effective way of packing the items. In some embodiments, a modified version of the FIG. 3 and FIG. 4 algorithm may be used to determine both the dimensions of the shipping containers and which items are to be placed in those containers. In this embodiment, Step 402 includes as "all available container types," a container for every dimension combination within the capability of the Custom-Container Machine 1202 to construct. Therefore, whichever container is selected as the "new container for packaging" in Step 330 will possess the most optimized container dimensions the Custom-Container Machine can construct.

In another embodiment, Step 402 comprises using stockpiled containers as input for "all available container types." The stockpiled containers can come from a plurality of different sources. In one embodiment, containers to be stockpiled can be constructed by the Custom-Container Machine during low-volume shipping periods. In some embodiments, the dimensions of the containers to be constructed are determined by a predictive machine learning model (e.g. a neural network). In some embodiments, past shipping data (e.g. products purchased, time of purchased, and location shipped, etc.) can be used to create the predictive model such that containers with the most optimized dimensions are stockpiled, for example, the containers with the highest likelihood of being most cost efficient for future orders. In some embodiments, the prior shipping data can be stored on the Remoted Database 1305 or stored locally and accessible by the Package Control System 1307. In some embodiments, the shipping data that is stored in the Database 1305 is continually or periodically updated as more orders are placed and the updated data is used to periodically update the predictive model. In other embodiments, the stockpiled containers can be ordered from a packing company and in some embodiments the order to the package company is based on the foregoing predictive model.

In Step 1108, the order in which the items are to be retrieved from Bins 1208 located, for example, on Shelves 1206 and placed into the Retrieval Bin 1212 is determined based off the retrieved item information. In some embodiments, the order is determined by the API Host Server 1301 using the item information stored in the Database 1305. The order of item retrieval is important because it affects labor costs and also determines what order the items can be removed from the Retrieval Bin 1212 because in some embodiments, the Retrieval Bin 1212 operates in effectively a First In Last Out (FILO) manner potentially preventing or making it extremely difficult to group together, for example, the first item retrieved and the last item retrieved. In some embodiments, the remote Database 1305 may also contain information such as hourly labor costs, bin distances, and number of retrieval bins. This additional information may be used in determining the optimal item grouping, item configuration, and/or container dimensions.

Further a part of Step 1108, once order of item retrieval is determined, the items are retrieved. In one embodiment, a Cart 1224 (1323) containing Retrieval Bins 1212(A)-(D) moves automatically (e.g., by motor or rail guide, etc.) to a proper to location to receive an item from a Warehouse Bin 1208(1)-(8) or 1321. In some embodiments, the Retrieval Bins 1212(A)-(D) are used to organize the retrieved ordered items such that they can be easily and quickly grouped later. In some embodiments, Warehouse Bins 1208 are the containers that store and organize all the items that are available to be ordered via the Mobile Device 1311 and the Computer 1313. In some embodiments, the Retrieval Bins 1212(A)-(D) have Indicators 1210 controlled by the API Host Server or Packing Control System 1307 to illustrate which Retrieval Bin 1208 the item is to be placed such that the ordered items can be removed from the Retrieval Bin 1208 in the optimal order for packing. In some embodiments, the Warehouse Bins 1208(1)-(8) have indicators 1210 controlled by the API Host Server 1301 or Packing Control System 1307 which provide the proper path for the ordered items to be retrieved. In some embodiments, the Cart 1224 is controlled by the Packing Control System 1307 or the API Host Server 1301 to automatically drive to the proper locations with the aid of methods such as machine vision and/or barcodes on the ground. In some embodiments, the path taken by the Cart 1224 is controlled by the Package Control System 1307 or the API Host Server 1301 in accordance with what has been determined to be the most optimum path of retrieval based on item information received from Database 1305. In some embodiments, the Cart 1224 comprises an Automated Retrieval Device 1222 which can retrieve the ordered item from a Warehouse Bin 1208(1)-(8) and place the ordered item in a Retrieval Bin 1212(A)-(D) based on item information received from Database 1305.

Concluding Step 1108, the Cart 1224 returns to the Staging Area 1226 with the ordered items it was sent to retrieve. In some embodiments, the Warehouse Bins 1208(1)-(8) are mobile and can be transported, for example, by a robot to the Staging Area 1226 in the determined order. In other embodiments, the Automatic Retrieval Device 1222 remains at the Warehouse Bins 1208(1)-(8) such that Cart 1224 drives to the Automatic Retrieval Device 1222 which places the ordered item on the Cart 1224 where thereafter the Cart 1224 returns to the Staging Area 1226. In these embodiments the proper order of delivery to the Staging Area 1226 is determined by the API Host Server 1301 or Packing Control System 1307.

In Step 1110, the optimized container dimensions for each container that needs to be constructed are given to the Custom-Container Machine 1202. In some embodiments, all dimensions are given at once and in others the items 1214 are packaged into the Constructed Container 1220 before inputting the next dimensions. In some embodiments, a packing worker inputs the proper dimension into the Custom-Container Machine 1202 via an input terminal on the Packing Computer 1204. In some embodiments, the input terminal can be a display UI that indicates the packing configuration of the ordered items with a 3D illustration. In another embodiment, the dimensions are loaded into the Custom-Container Machine 1202 automatically via the API Host Server 1301 or Package Control System 1307 once the optimized dimensions are determined by the API Host Server 1301.

In Step 1112, a container with the optimized dimensions is constructed by the Custom-Container Machine 1202. In some embodiments, the container is constructed automatically once the Items 1214 are in the proper position in the Cartonization Area 1228 through the use of sensors (e.g., machine vision or pressure sensors, etc.). In other embodiments, a packing worker presses a button or scans a bar code prompting the Custom-Container Machine 1202 to construct the container.

In Step 1114, the ordered items are properly placed in the Cartonization Area 1228 to be cartonized by the Custom-Container Machine 1202. In some embodiments, the items are removed from the Cart 1216 in the Staging Area 1226 by an Automated Positioning Device 1232. The items are removed from the Retrieval Bins 1212 in an order determined by the Host API Server 1301 that most efficiently places the Items 1214 in the Cartonization Area 1228 for later cartonization. In another embodiment, a packing worker removes the items and places them in the Cartonization Area 1228. In some embodiments, the Indicators 1210 will signal to the packing worker which Retrieval Bin 1212(A)-(D) the item to be removed is in. In some embodiments, the Cartonization Area 1228 comprises a Conveyor Belt 1218 that moves the Items 1214 to where they need to be for cartonization.

Once the Container 1220 is constructed, the proper Items 1214 are placed into the Container 1220 in the proper configuration and the Container 1220 is sealed. In some embodiments, a packing worker places the items in the container in accordance with a GUI visualization that is generated based on the optimized configuration as determined by the API Host Server 1301. In another embodiment, an Automatic Packing Device 1230 places the ordered items into the Container 1220 based on the optimized configuration as determined by the API Host Server 1301. In some embodiments, the container is assembled first and then the ordered items are placed into it. In other embodiments, the container is constructed around the ordered items. In some embodiments, each ordered item is registered with the Package Control System 1307 or API Host Server 1301 as it is placed into the container (e.g. a bar code on the item is scanned or a ID code is entered) and an indication that the ordered item has been properly packed may be given. In some embodiments, the ordered item is rendered on a GUI so that each item can be verified to be packed inside the proper container by, for instance, an Item Packaging and Verification Machine 1319. In other embodiments, the Packing Control System 1307 or the API Host Server 1301 may determine whether an order is completely packed and ready for shipment by comparing a list of the ordered items and a list of items that have been verified packed.

In Step 1116, a package label is printed and placed on the container after it is properly packed and sealed. In some embodiments, the package is sealed and labeled automatically. The package is then verified complete and passed to a shipping station and shipped.

The present disclosure can be implemented by a general purpose computer programmed in accordance with the principals discussed herein. It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, app, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network or as an app on a mobile device such as a tablet, PDA or phone.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer or mobile device. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms data memory including non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device or monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although examples are illustrated and described herein, embodiments are nevertheless not limited to the details shown, since various modifications and structural changes may be made therein by those of ordinary skill within the scope and range of equivalents of the claims.

What is claimed is:

1. A method performed by a host server for managing a shipment of a plurality of products to an online customer, comprising:
    obtaining a request for a packing instruction from a user via a user interface or server database, wherein the request comprises: weight information, dimension information of the plurality of products, custom-container machine information,
    wherein the custom-container machine information comprises an allowable set of container dimensions the custom-container machine can construct;
    obtaining, from the computer database, a rate table from a computer database including shipping rate information related to one or more shipping carriers;
    ranking the plurality of products based on at least one of their weight information and dimension information to generate a first ranking list;

determining, based on the first ranking list and the custom-container machine information, a plurality of layout configurations for packing the plurality of products into at least one container selected from the one or more containers, wherein the available one or more containers is based on the custom-container machine information and wherein determining each of the plurality of layout configurations comprises:
picking a product on top of the first ranking list,
retrieving, from a database, rules related to: existing products already assigned for packing, the product, the container, and the rate table,
determining whether a container is found in the second ranking list to satisfy the rules,
when the container is found in the second ranking list to satisfy the rules, assigning the product to a location within the container for packing,
when no container is found in the second ranking list to satisfy the rules,
ranking a plurality of new containers to generate a third ranking list,
opening a new container that has a lowest cost-per-item among the third ranking list, and
assigning the product to a location within the new container for packing,
updating information of the product, the container, the second ranking list, and the layout configuration,
updating the first ranking list by removing the product from the first ranking list, and
iterating the above steps until no product is left in the first ranking list;
selecting a layout configuration from the plurality of layout configurations based at least partially on the rate table, wherein the selected layout configuration minimizes a cost of shipping the plurality of products;
providing a packing instruction based on the selected layout configuration to the custom container machine;
assigning the product to a location within the container for packing;
updating the first ranking list by removing the product from the first ranking list;
working remotely in concert with the remote server to generate a visual illustration of the selected layout configuration;
providing the visual illustration as a packing instruction to the user via the user interface, wherein the plurality of products shown in the visual illustration are sorted in an ascending order of face depth in three dimensional projection; and
when the online shopper adds, removes or modifies a product in the online shopping cart,
updating the plurality of layout configurations for packing an updated plurality of products based on a user input that triggers at least one of the following actions on the user interface: breaking apart items in a container, changing a size of a container, altering a dimensional weight associated with a container, or adding a condition for packing the updated plurality of products,
updating the selected layout configuration based on the updated plurality of layout configurations,
generating an updated visual illustration based on the updated layout configuration, and
providing the updated visual illustration as an updated packing instruction.

2. The method of claim 1, wherein the method further comprises providing, based on the visual illustration, a shipping cost for the plurality of products to the user, wherein the shipping cost is to be presented to the online shopper via the website or the app as a real-time response to the plurality of products added into the online shopping cart; and
providing an updated shipping cost for the updated plurality of products as a real-time response to the updated plurality of products in the online shopping cart.

3. The method of claim 1, wherein the rate table lists shipping rates related to each of the one or more shipping carriers according to information about at least one of the following:
a weight of a container having at least one product to be shipped;
a container type of the container; and
a product type of the at least one product;
insurance information of the at least one product; and
a discount or deal agreed between the user and at least one of the one or more shipping carriers regarding a shipment of the plurality of products.

4. The method of claim 1, wherein:
the request further comprises characteristics of the plurality of products, wherein the characteristics comprise whether each product is stackable, rollable, foldable, and/or forbidden to be packed with another product; and
determining the plurality of layout configurations comprises determining each of the plurality of layout configurations based on the characteristics of the plurality of products.

5. The method of claim 1, further comprising:
obtaining, regarding each of the one or more shipping carriers, a dimensional weight associated with the at least one container from a third party or the shipping carrier, wherein the dimensional weight is determined based on a volume and a dimensional factor associated with the at least one container; and
comparing the dimensional weight with actual weight of the at least one container including the plurality of products to generate a comparison result, wherein the selected layout configuration is selected further based on the comparison result.

6. The method of claim 5, wherein the rate table comprises shipping rates according to a discount or deal agreed between the user and at least one of the one or more shipping carriers regarding the dimensional weight associated with the at least one container.

7. The method of claim 1, further comprising:
obtaining, from a third party or the one or more shipping carriers, zone information of origin and destination for shipping the plurality of products, wherein:
the zone information is determined by each of the one or more shipping carriers, and
the selected layout configuration is selected further based on the zone information.

8. The method of claim 7, wherein the rate table comprises shipping rates according to a discount or deal agreed between the user and at least one of the one or more shipping carriers regarding the zone information associated with the origin and the destination for shipping the plurality of products.

9. The method of claim 1, wherein:
the first ranking list includes the plurality of products ranked in at least one of: a volume descending order, a longest single dimension order, and a largest cross section order based on a user input; and the second ranking list includes the one or more containers ranked in at least one of: an ascending order of volume remaining in the one or more containers, an ascending order of additional cost to add next product in the one or more containers, and an ascending order of cost per product in the one or more containers.

10. The method of claim 9, wherein determining each of the plurality of layout configurations comprises:
picking a product on top of the first ranking list;
searching, from top to bottom of the second ranking list, for a container that satisfies one or more rules based on information of the product, the container, and the rate table;
assigning the product to a location within the container for packing;
updating information of the product, the container, the second ranking list, and the layout configuration;
updating the first ranking list by removing the product from the first ranking list; and
iterating the above steps until no product is left in the first ranking list.

11. The method of claim 10, wherein searching for a container comprises searching for a container that adds a minimum cost for shipping the product in the container in addition to shipping existing products that are already assigned for packing, compared to shipping the product in any other container in the second ranking list.

12. The method of claim 10, further comprising:
determining that no container in the second ranking list satisfies the one or more rules based on existing products already assigned for packing;
ranking one or more new containers to generate a third ranking list;
opening a new container that has a lowest cost-per-item among the third ranking list; and
assigning at least one product previously unable to be assigned to the new container.

13. The method of claim 1, further comprising:
calculating, based on each of the plurality of layout configurations and the rate table, an estimated shipping rate for a shipment of the plurality of products according to the layout configuration, wherein selecting the layout configuration comprises selecting the layout configuration that minimizes the estimated shipping rate among the plurality of layout configurations.

14. A system for packing control, comprising:
a host server having at least one processor, storage, and a communication platform connected to a network in communication with a web server or an app;
a custom-container machine;
a subscriber computer having at least one processor, storage, and a communication platform connected to the network, wherein
the subscriber computer is configured to access the host server via a key and run a method implemented on the host server to manage a shipment of a plurality of products to a remote user, and
the plurality of products are added by the remote user into a remote database via the web server or the app;
the host server is further configured to:
obtain a request for a packing instruction from a user via a user interface or a server database, wherein the request comprises: weight information, dimension information of the plurality of products, custom-container machine information,
wherein the custom-container machine information comprises an allowable set of container dimensions the custom-container machine can construct;
obtain, from a computer database, a rate table from the computer database including shipping rate information related to one or more shipping carriers;
the host server further comprises:
a ranking unit configured for
ranking the plurality of products based on at least one of their weight information and dimension information to generate a first ranking list;
a layout determiner configured for
determining, based on the first ranking list and the custom-container machine information, a plurality of layout configurations for packing the plurality of products into at least one container selected from one or more containers, wherein the available one or more containers is based on the custom-container machine information and wherein determining each of the plurality of layout configurations comprises:
picking a product on top of the first ranking list,
retrieving, from a database, rules related to: existing products already assigned for packing, the product, a respective container of the available one or more containers, and the rate table,
determining whether a container is found in a second ranking list to satisfy the rules,
when the container is found in the second ranking list to satisfy the rules, assigning the product to a location within the container for packing,
when no container is found in the second ranking list to satisfy the rules,
ranking a plurality of new containers to generate a third ranking list,
opening a new container that has a lowest cost-per-item among the third ranking list, and
assigning the product to a location within the new container for packing,
updating information of the product, the container, the second ranking list, and a layout configuration,
updating the first ranking list by removing the product from the first ranking list, and
iterating the above steps until no product is left in the first ranking list;
selecting a selected layout configuration from the plurality of layout configurations based at least partially on the rate table, wherein the selected layout configuration minimizes a cost of shipping the plurality of products;
providing a packing instruction based on the selected layout configuration to the custom-container machine;
assigning the product to a location within the container for packing;
updating the first ranking list by removing the product from the first ranking list;
working remotely in concert with a layout visualizer to generate a visual illustration of the selected layout configuration;
providing the visual illustration as the packing instruction to the remote user via the user interface, wherein the plurality of products shown in the visual illustration are sorted in an ascending order of face depth in three dimensional projection and when the remote user adds, removes or modifies an adjusted product in the plurality of products:
    updating the plurality of layout configurations for placing an updated plurality of products based on a user input that triggers at least one of the following actions via the web server or the app: breaking apart items in the container, changing a size of the container, altering a dimensional weight associated with the container, or adding a condition for packing the updated plurality of products,
    updating the selected layout configuration based on the updated plurality of layout configurations;
the layout visualizer configured for:
    generating the visual illustration of the selected layout configuration, and
    generating an updated visual illustration based on the updated selected layout configuration; and
a packing instructor configured for providing:
    the packing instruction comprising the visual illustration to the user via the user interface, and
    an updated packing instruction comprising the updated visual illustration to the user via the user interface.

15. The system of claim 14, wherein:
the user interface is further configured for obtaining, regarding each of the one or more shipping carriers, an associated dimensional weight associated with the at least one container from a third party or the shipping carrier, wherein the associated dimensional weight is determined based on a volume and a dimensional factor associated with the at least one container; and
the layout determiner is further configured for comparing the associated dimensional weight with actual weight of the at least one container including the plurality of products to generate a comparison result, wherein the selected layout configuration is selected further based on the comparison result, wherein the rate table comprises shipping rates according to a discount or deal agreed between the user and at least one of the one or more shipping carriers regarding the associated dimensional weight associated with the at least one container.

16. The system of claim 14, wherein:
the user interface is further configured for obtaining, from a third party or the one or more shipping carriers, zone information of origin and destination for shipping the plurality of products, wherein:
    the zone information is determined by each of the one or more shipping carriers,
    the selected layout configuration is selected further based on the zone information, and
    the rate table comprises shipping rates according to a discount or deal agreed between the user and at least one of the one or more shipping carriers regarding the zone information associated with the origin and the destination for shipping the plurality of products.

17. The system of claim 14, wherein:
the first ranking list includes the plurality of products ranked in at least one of: a volume descending order, a longest single dimension order, and a largest cross section order based on a second user input; and
the second ranking list includes the one or more containers ranked in at least one of: an ascending order of volume remaining in the one or more containers, an ascending order of additional cost to add next product in the one or more containers, and an ascending order of cost per product in the one or more containers.

18. The system of claim 17, wherein determining each of the plurality of layout configurations comprises:
searching, from top to bottom of the second ranking list, for a satisfying container that satisfies one or more rules based on information of the product, the satisfying container, and the rate table;
assigning the product to a satisfying location within the satisfying container for packing;
updating the information of the product, the satisfying container, the second ranking list, and the layout configuration;
updating the first ranking list by removing the product from the first ranking list; and
iterating the above steps until no product is left in the first ranking list,
wherein searching for the satisfying container comprises searching for the satisfying container that adds a minimum cost for shipping the product in the satisfying container in addition to shipping respective existing products that are already assigned for packing, compared to shipping the product in any other container in the second ranking list.

19. A method for automated packing, comprising:
obtaining a request for items, wherein the request is received from a remote webserver or app and the request is received by a host server;
retrieving from a remote database stored item information associated with each item requested, the stored item information including weight information and dimension information;
retrieving information on a custom-container machine from the custom-container machine or the host server comprising an allowable set of box dimensions the custom-container machine can construct;
obtaining, from a computer database, a rate table from the computer database including shipping rate information related to one or more shipping carriers;
ranking the items based on at least one of their weight information and dimension information to generate a first ranking list;
determining, based on the first ranking list and the custom-container machine information, a plurality of layout configurations for packing the items into at least one box selected from the one or more boxes, wherein the available one or more boxes is based on the custom-container machine information and wherein determining each of the plurality of layout configurations comprises:
picking an item on top of the first ranking list,
retrieving, from a database, rules related to: existing items already assigned for packing, the item, a box, and the rate table,
determining whether the box is found in a second ranking list to satisfy the rules,
when the box is found in the second ranking list to satisfy the rules, assigning the item to a location within the box for packing,
when no box is found in the second ranking list to satisfy the rules,
    ranking a plurality of new boxes to generate a third ranking list,
    opening a new box that has a lowest cost-per-item among the third ranking list, and
    assigning the item to a location within the new box for packing,
updating information of the item, the box, the second ranking list, and a layout configuration, updating the first ranking list by removing the item from the first ranking list, and iterating the above steps until no item is left in the first ranking list;

selecting a layout configuration from the plurality of layout configurations based at least partially on the rate table, wherein the selected layout configuration minimizes a cost of shipping the plurality of items;

providing a packing instruction based on the selected layout configuration to the custom-container machine;

assigning the item to a location within the box for packing;

updating the first ranking list by removing the item from the first ranking list;

working remotely in concert with the remote webserver or app to generate a visual illustration of the selected layout configuration;

providing the visual illustration to the remote webserver or app, wherein the requested items shown in the visual illustration are sorted in an ascending order of face depth in three dimensional projection;

when the remote webserver or app adds, removes or modifies an item requested in the request,
- updating the optimized item configuration based on a remote webserver input or an app input that triggers at least one of the following actions on the remote webserver or app: breaking apart items in the box, changing a size of the box, altering a dimensional weight associated with the box, or adding a condition for packing the items in the request;
- generating an updated visual illustration based on the updated optimized item configuration; and
- providing the updated visual illustration to the remote webserver or app;

retrieving items from a location in an order based on the determined optimized item configuration;

generating a set of instructions based on the optimized item configuration;

transmitting the set of instructions to the custom-container machine;

constructing the box on demand based on the transmitted set of instructions; and placing the retrieved items into the constructed box based on the optimized item configuration.

20. The method of claim 19, further comprising:

verifying each item that is placed into the constructed box matches the items of the request for items, wherein the step of retrieving the items comprises:
- controlling, via the host server, an automated device with at least one box and an item retrieval device, wherein the automated device moves to a location and the item retrieval device retrieves and places the retrieved item into one of the one or more boxes based on the optimized item configuration,
- placing the retrieved items in a staging area based on the optimized item configuration, wherein the optimized item configuration is determined based on the custom-container machine information, wherein the custom-container machine information comprises an allowable set of box dimensions the custom-container machine can construct;

storing order information based on the requested items in the remote database;

training a forecasting model based the stored order information;

constructing boxes with dimensions based on the trained forecasting model; and stockpiling the constructed boxes for future orders.

* * * * *